(12) United States Patent
Lang et al.

(10) Patent No.: US 8,986,423 B2
(45) Date of Patent: Mar. 24, 2015

(54) HEAP LEACH OPERATIONS

(75) Inventors: Kent Lang, Denver, CO (US); Gilles Mathieu, Meudon (FR); Roland Banas, Tucson, AZ (US); Robert A. Will, Littleton, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 206 days.

(21) Appl. No.: 13/513,551

(22) PCT Filed: Dec. 1, 2010

(86) PCT No.: PCT/US2010/058544
§ 371 (c)(1),
(2), (4) Date: Aug. 16, 2012

(87) PCT Pub. No.: WO2011/068859
PCT Pub. Date: Jun. 9, 2011

(65) Prior Publication Data
US 2012/0297928 A1  Nov. 29, 2012

Related U.S. Application Data

(60) Provisional application No. 61/265,756, filed on Dec. 2, 2009.

(51) Int. Cl.
*C22B 5/00* (2006.01)
*C22B 3/02* (2006.01)
*C22B 3/04* (2006.01)
*C22B 15/00* (2006.01)

(52) U.S. Cl.
CPC ... *C22B 3/02* (2013.01); *C22B 3/04* (2013.01); *C22B 15/0065* (2013.01)
USPC ............ 75/375; 75/386; 75/743; 299/5

(58) Field of Classification Search
CPC .......... C22B 3/02; C22B 15/0065; C22B 3/04
USPC .............................. 75/743, 375, 386; 299/5
See application file for complete search history.

(56) References Cited

U.S. PATENT DOCUMENTS

| 4,526,615 A | * | 7/1985 | Johnson ............................ 299/5 |
| 5,030,279 A | | 7/1991 | Krauth |
| 6,957,573 B2 | | 10/2005 | Faybishenko |

(Continued)

OTHER PUBLICATIONS

International Search Report of PCT Application No. PCT/US2010/058544 dated Jan. 24, 2011.

(Continued)

*Primary Examiner* — George Wyszomierski
*Assistant Examiner* — Tima M McGuthry Banks

(57) ABSTRACT

A method of heap leaching including forming a heap lift, installing a horizontal solution collection system between the heap layers including a horizontal tubing with a wireline data collection tool disposed therein, providing a heap leach model for modeling the heap leach operation including a solvent formulation and a irrigation setting, obtaining collected data from the wireline data collection tool while irrigating the heap lift, the collected data including in-situ material parameters of the heap layers and in-situ solution parameters of the solution flowing in the heap layers, modeling the heap leach operation using the collected data based on the heap leach model to generate a result, and adjusting the heap leach operation based on the result.

6 Claims, 15 Drawing Sheets

(56) References Cited

U.S. PATENT DOCUMENTS 7,575,622 B2    8/2009   Crundwell et al.
7,887,617 B2 *  2/2011   Auranen ..................... 75/10.12

OTHER PUBLICATIONS

GeoSystems Analysis, Inc. "Escondida CPY Heap Demonstration Project Monitoring Instrumentation Installation Draft Report", Oct. 2007.

GeoSystems Analysis, Inc. "In situ Sensor Testing at Cerro Colorado for Sulfide Heap Demonstration Project", Dec. 4, 2006.

Grahn "Optimizing Heap Processes Using Real-Time In Situ Monitoring" Abstract from HYDROPROCESS2008 II International Workshop on Process Hydrometallurgy, May 2008, Santiago, Chile. 12 pages.

Guzman, et al., "Geochemical profiling of a Sulfide Leaching Operation: A Case Study", SME Annual Convention, Mar. 2006, t. Louis, MO., USA, 16 pages.

Herrera, et al., "Modelling of Low Grade Copper Suphide Ores Leaching at Escondida Biolix Demonstrating Plant", International Colloquium Hydrometallurgical on Processing of Copper Sulfides, Hydro-Sulfides, Santiago, Chile, Apr. 16-19, 2004.

Honeywell, Success Story "Mantos Blancos Mining Upgrades Leach Pad Monitoring and Reduces Costs with Honeywell's Wireless Solution", 2007, 3 pages.

Keller, et al., "Monitoring of the Geochemical Evolution of Waste Rock Facilities at Newmont's Phoenix Mine", 2011, 10 pages.

Milczarek, et al., "In situ Monitoring of a Closed Waste Rock Facility", Proceedings of the eighth International Conference on Acid Rock Drainage, Jun. 22-26, 2009, Skelleftea, Sweden.

* cited by examiner

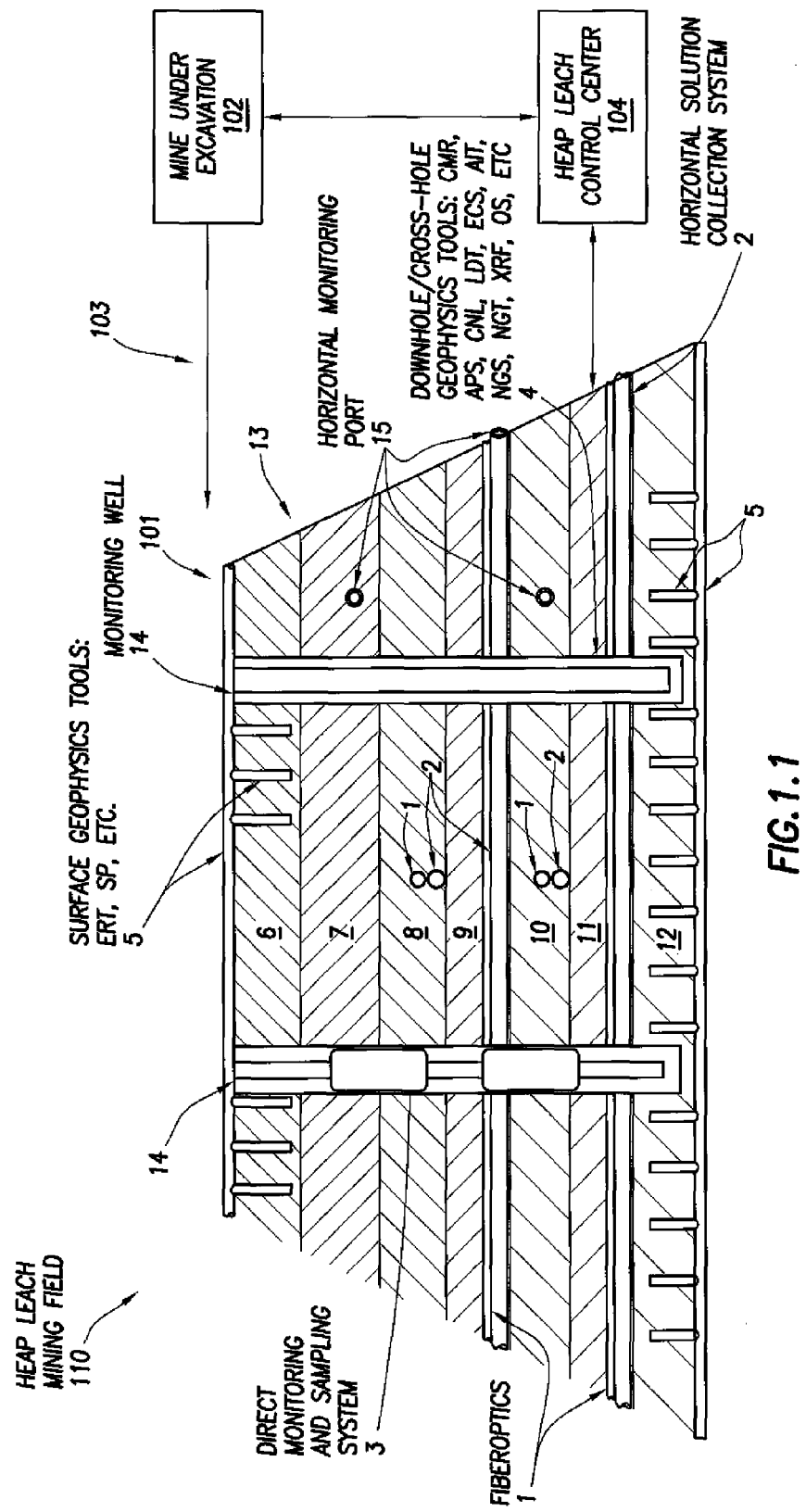
FIG.1.1

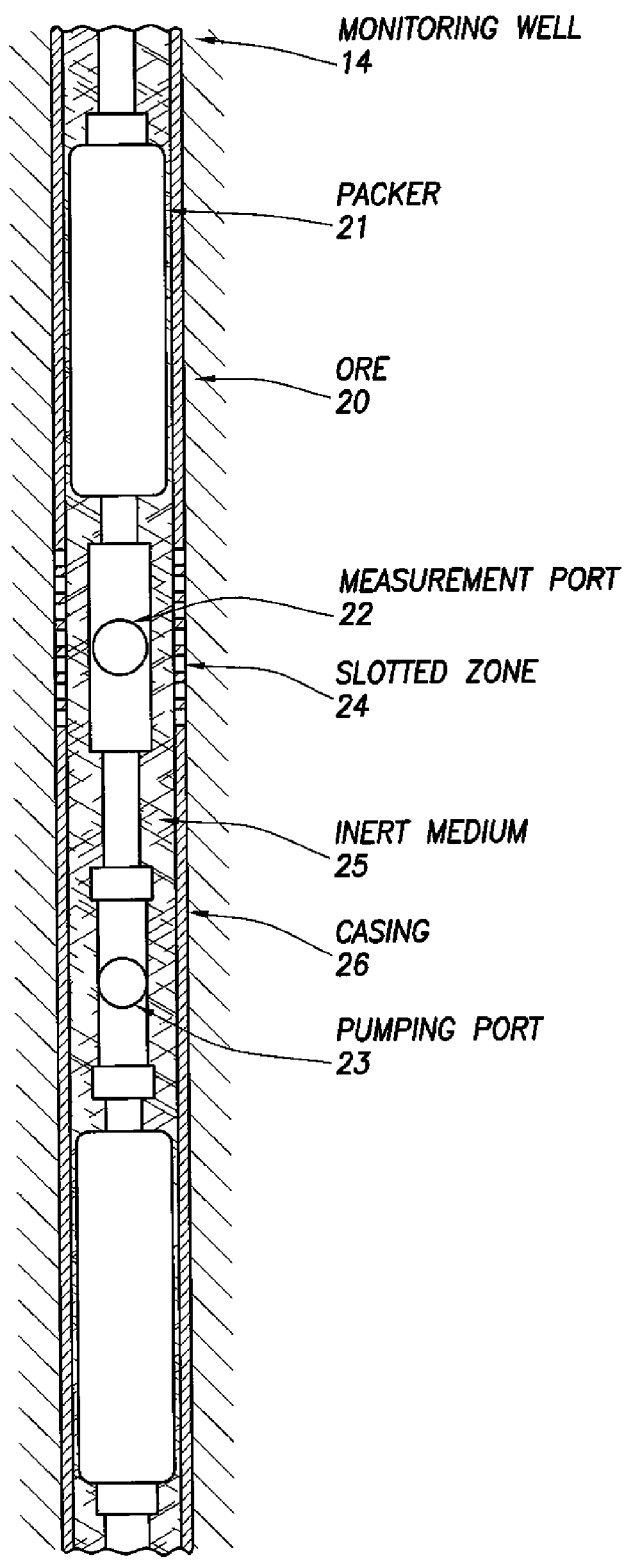
FIG.1.2

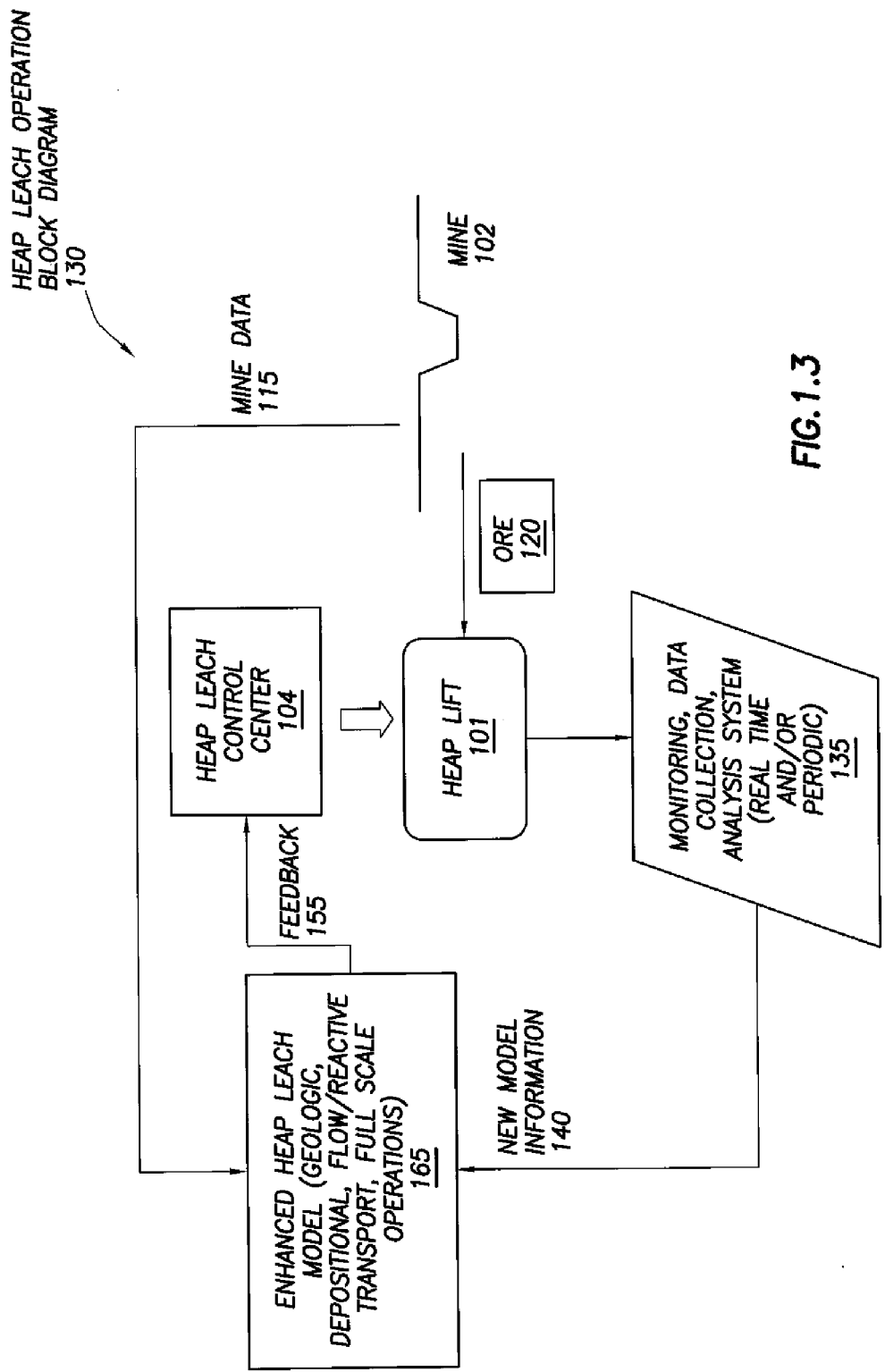
FIG.1.3

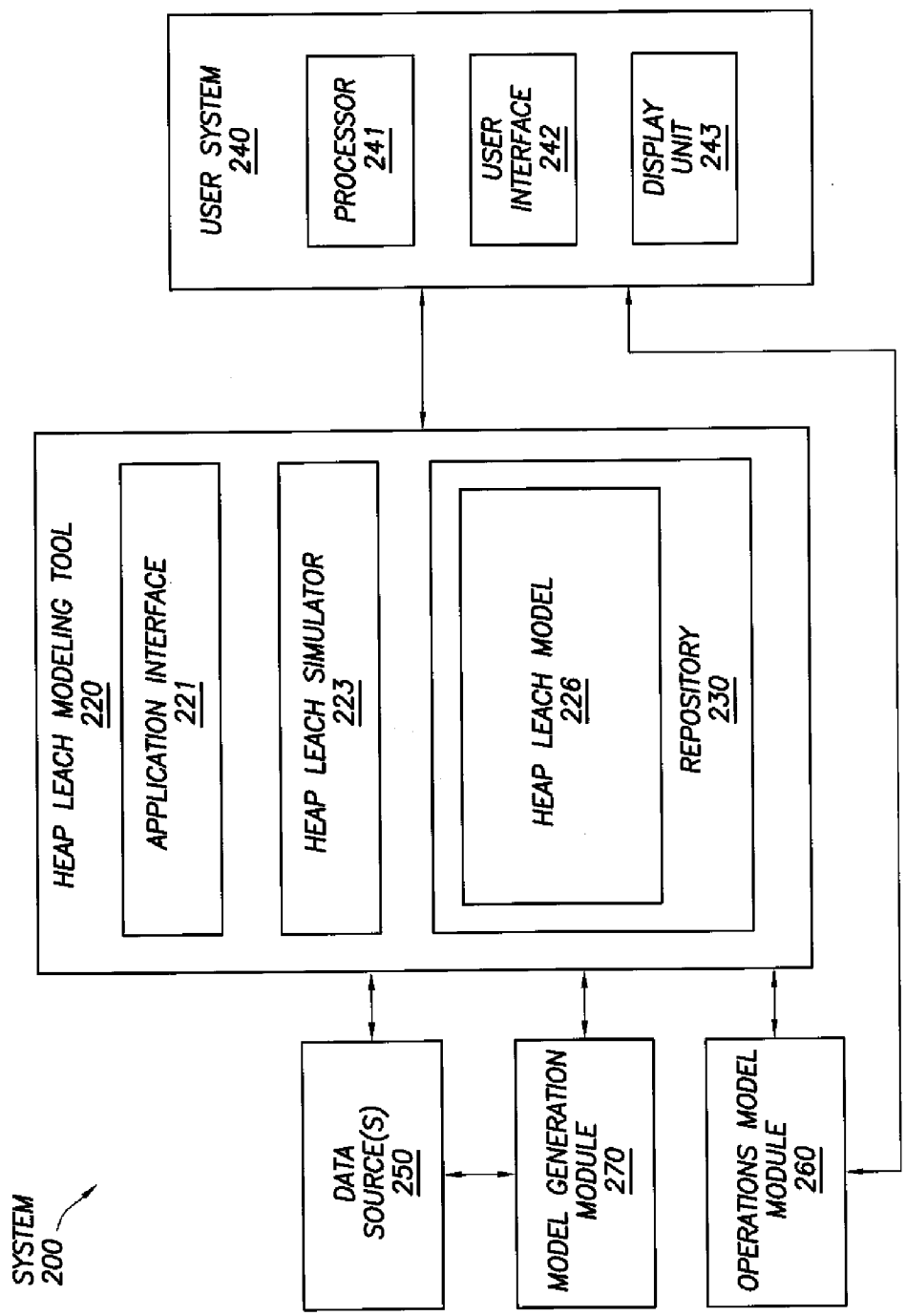
FIG.2.1

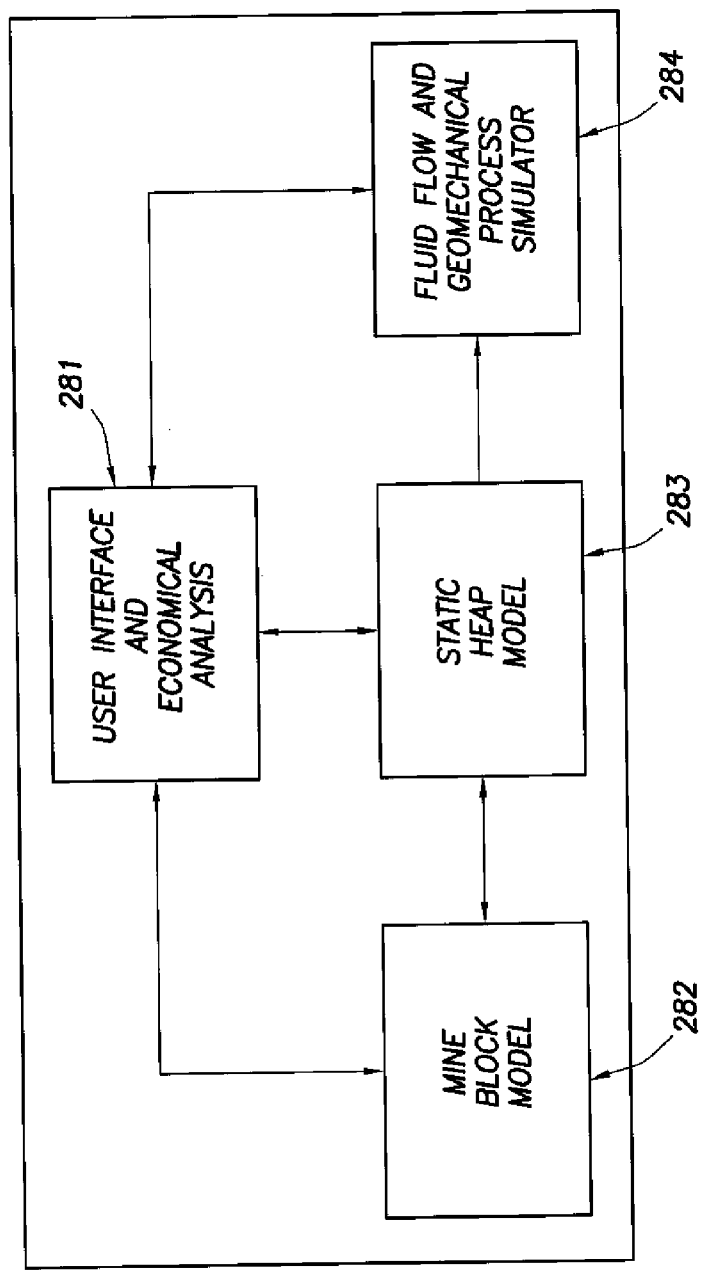
FIG.2.2

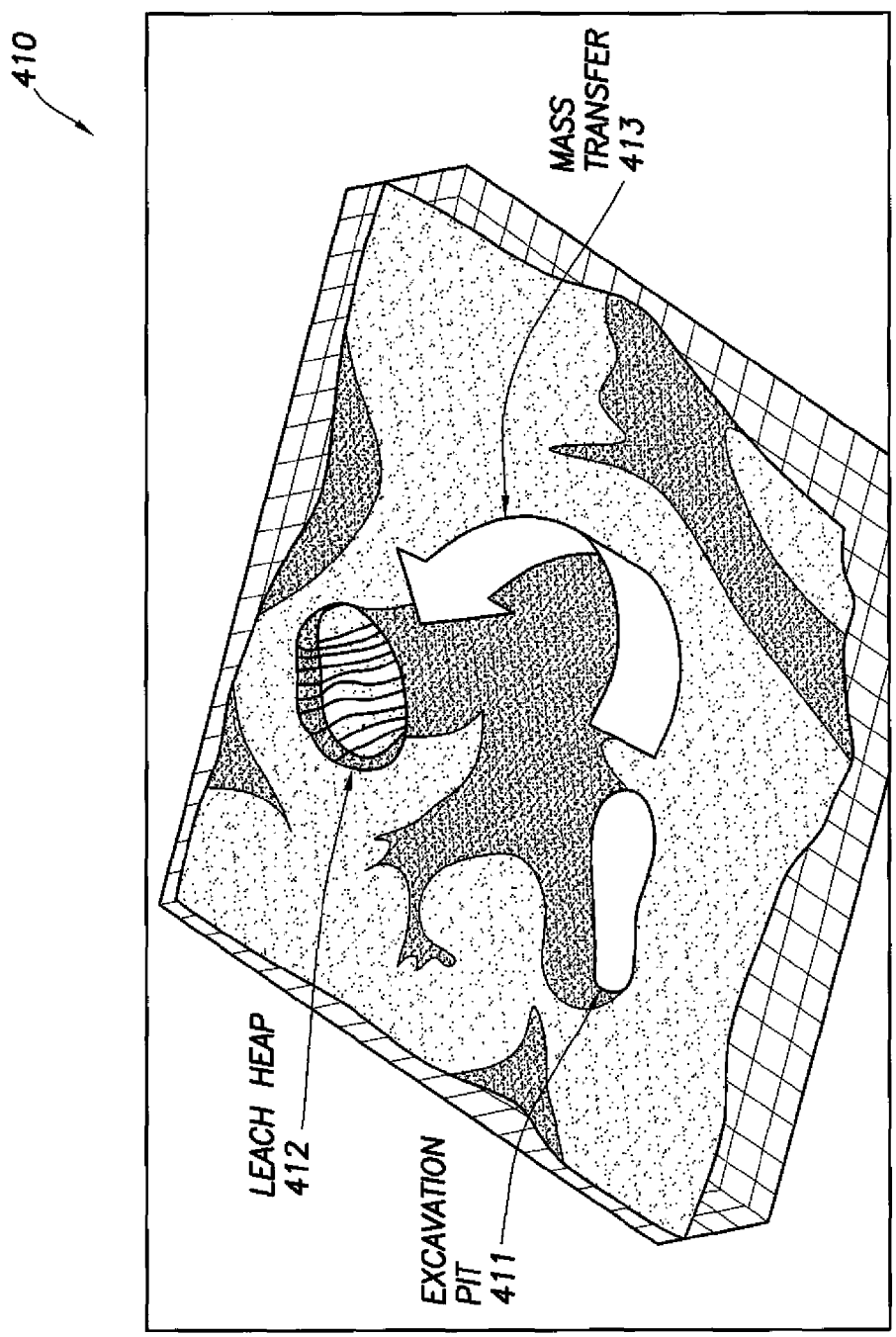
FIG. 4.1

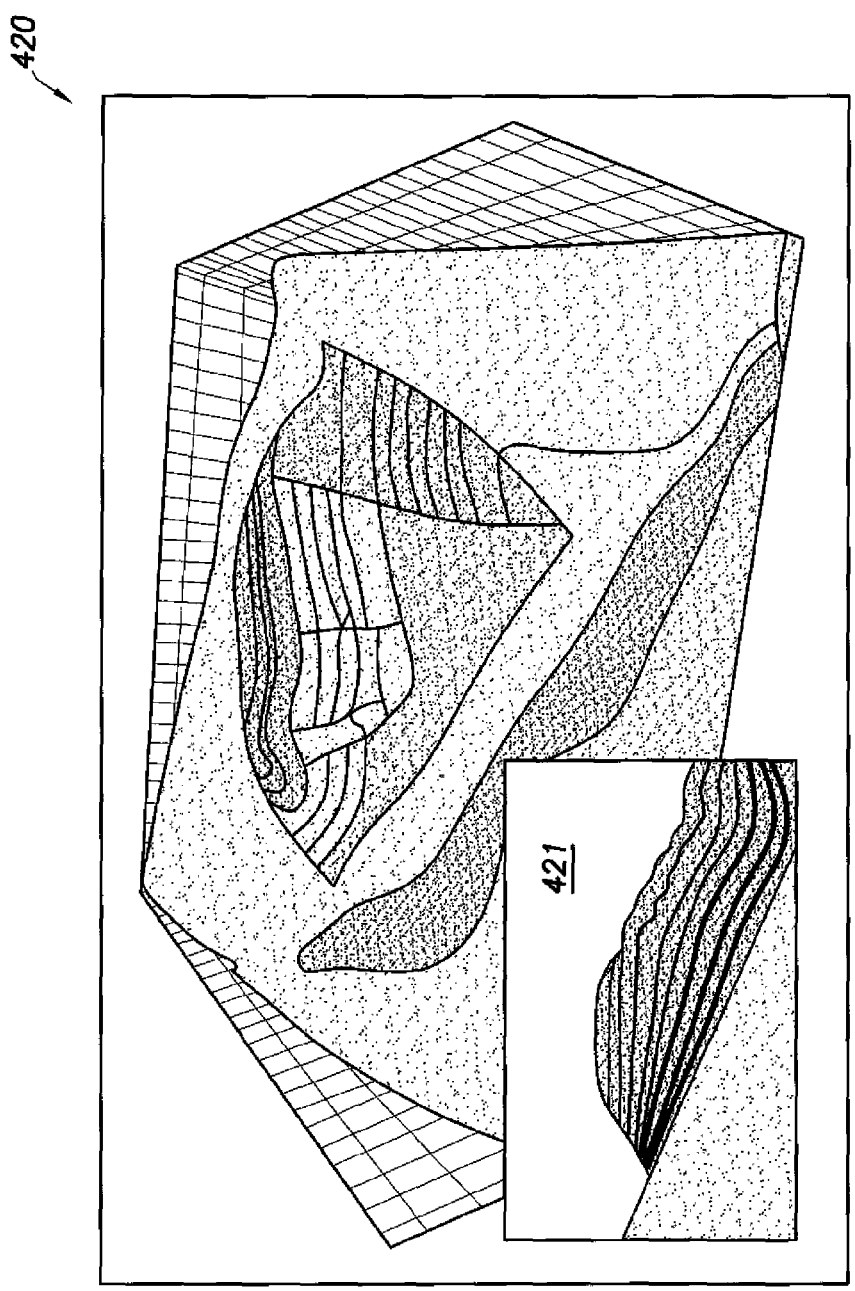
FIG. 4.2

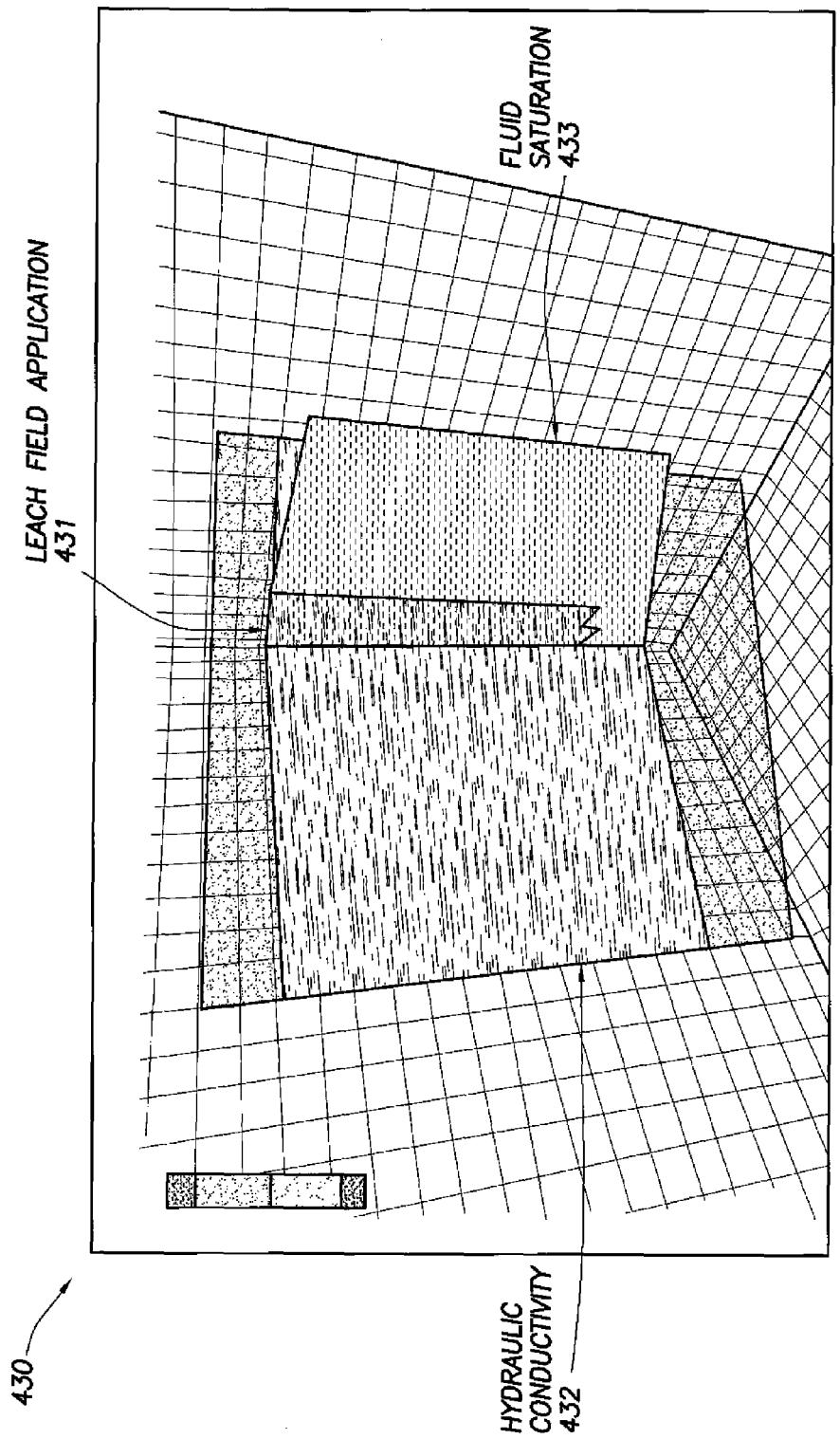
FIG. 4.3

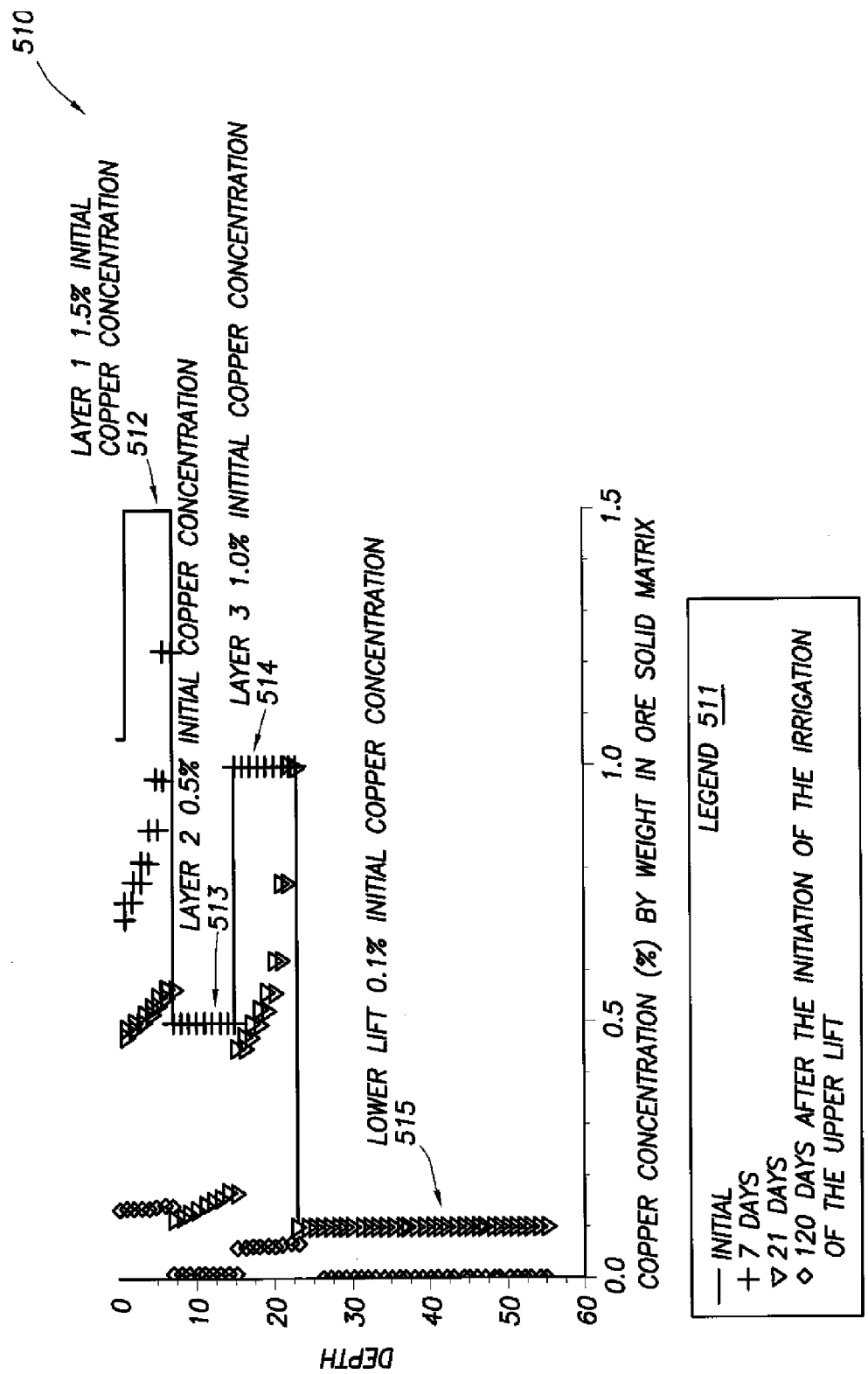
FIG.5.1

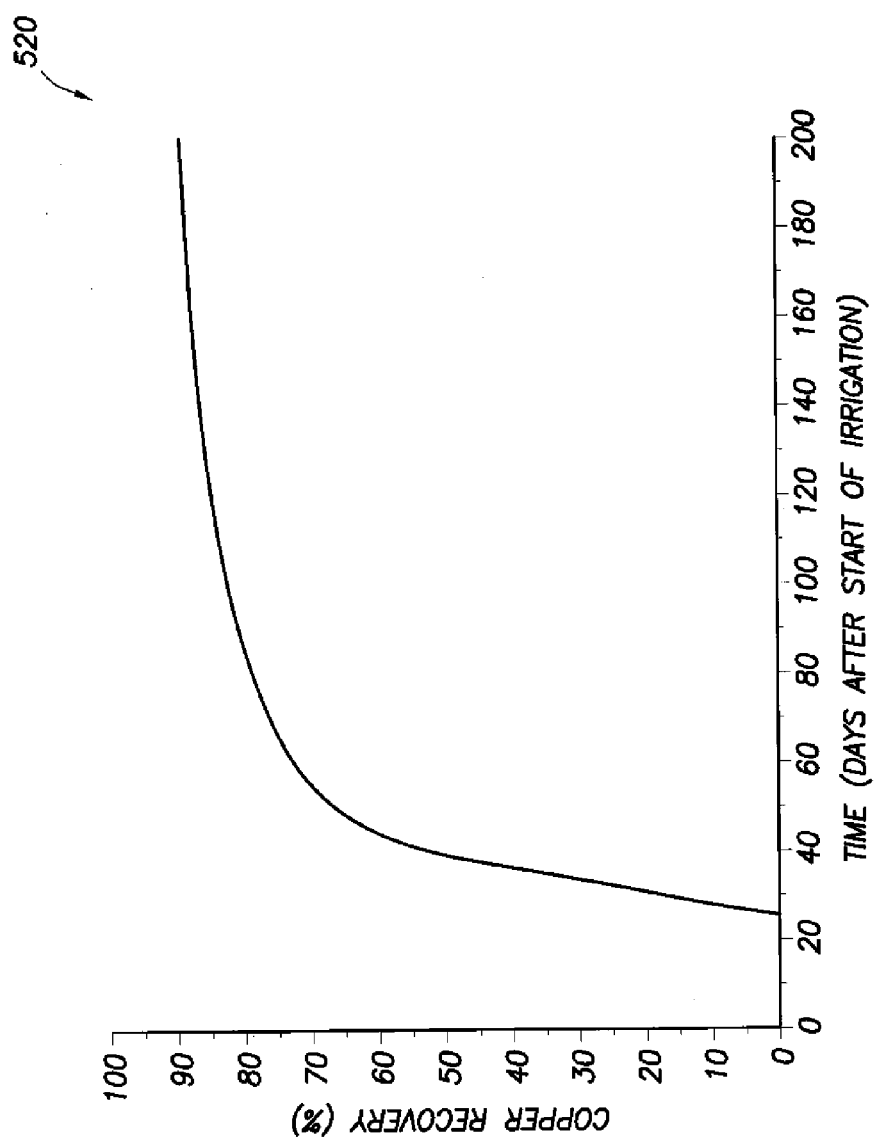
FIG.5.2

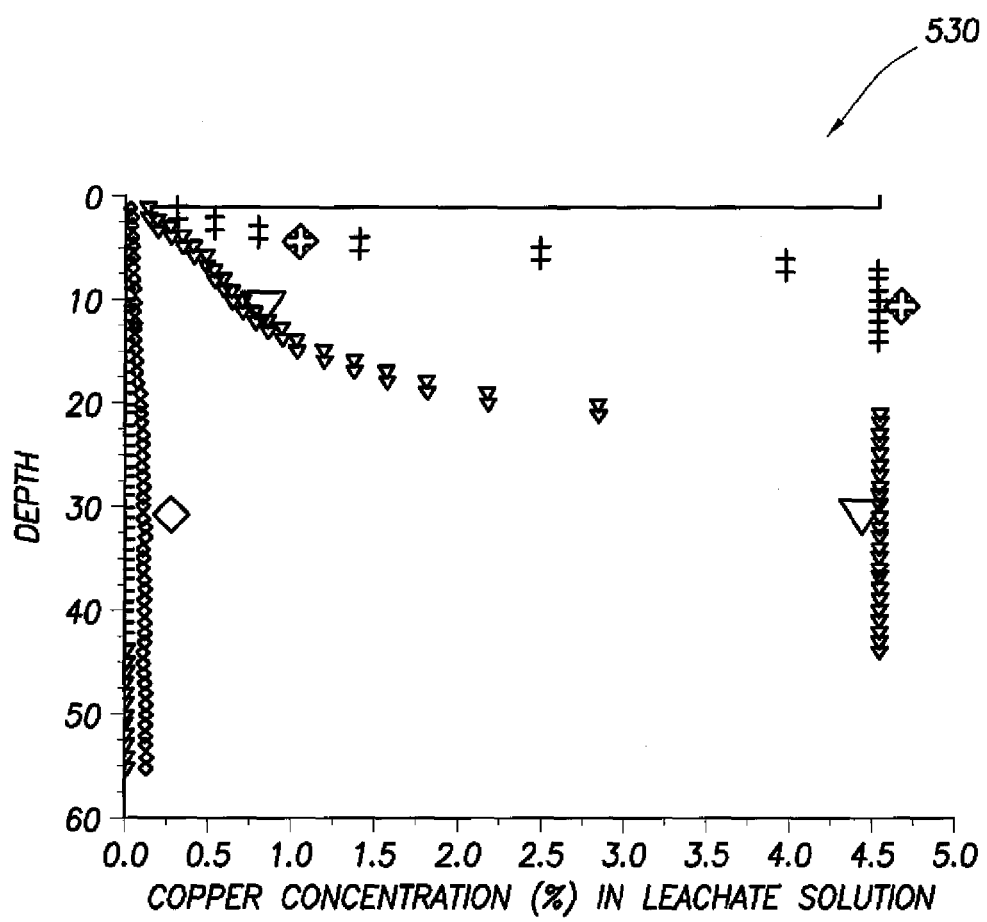
FIG.5.3

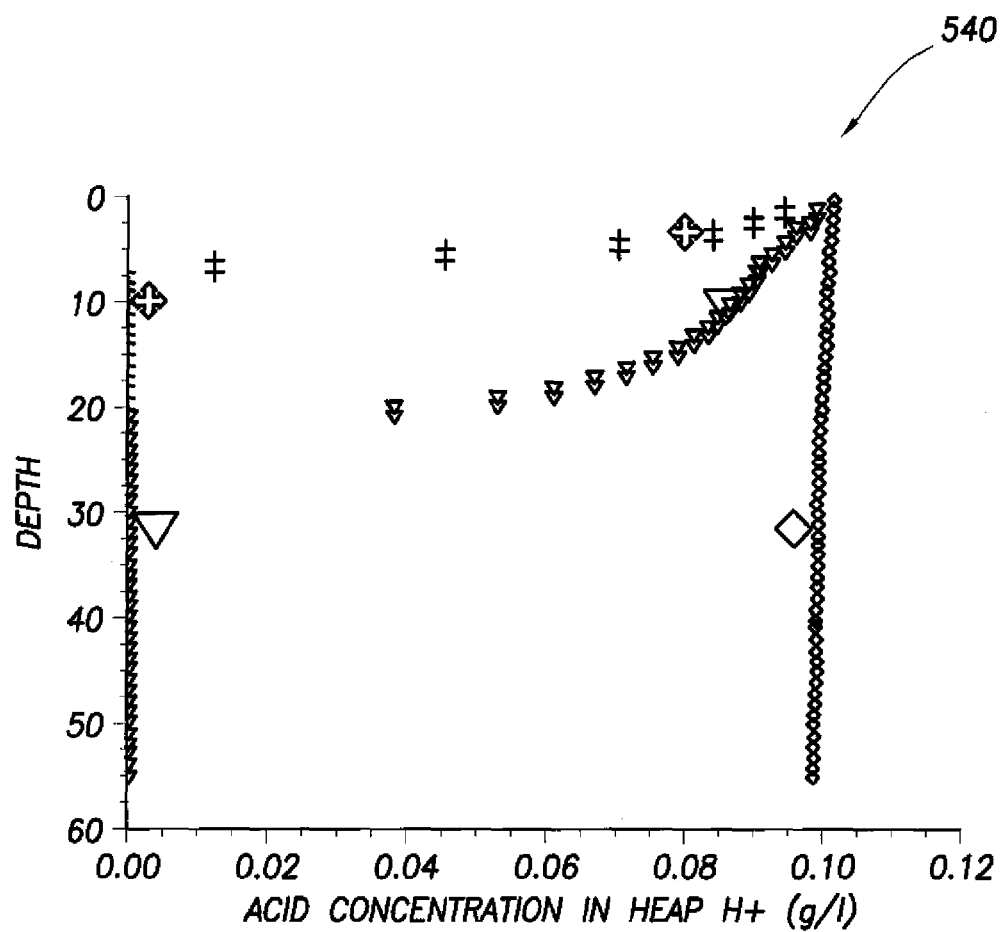
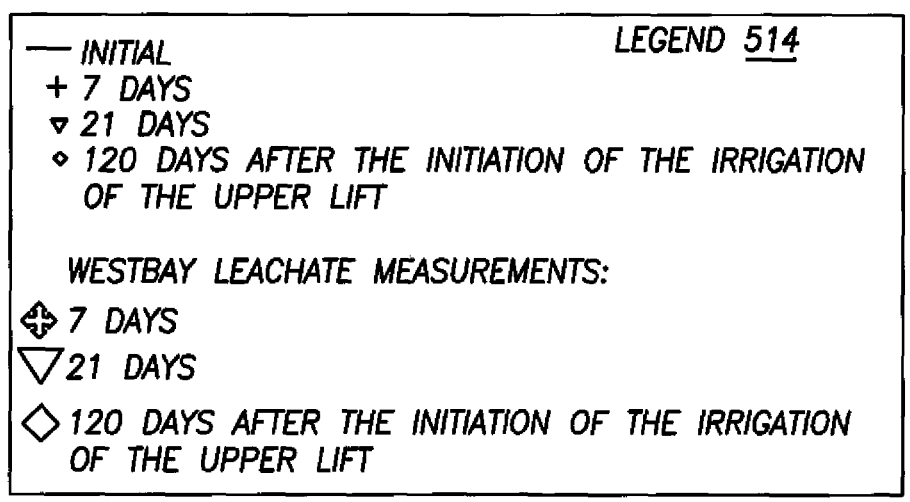
FIG.5.4

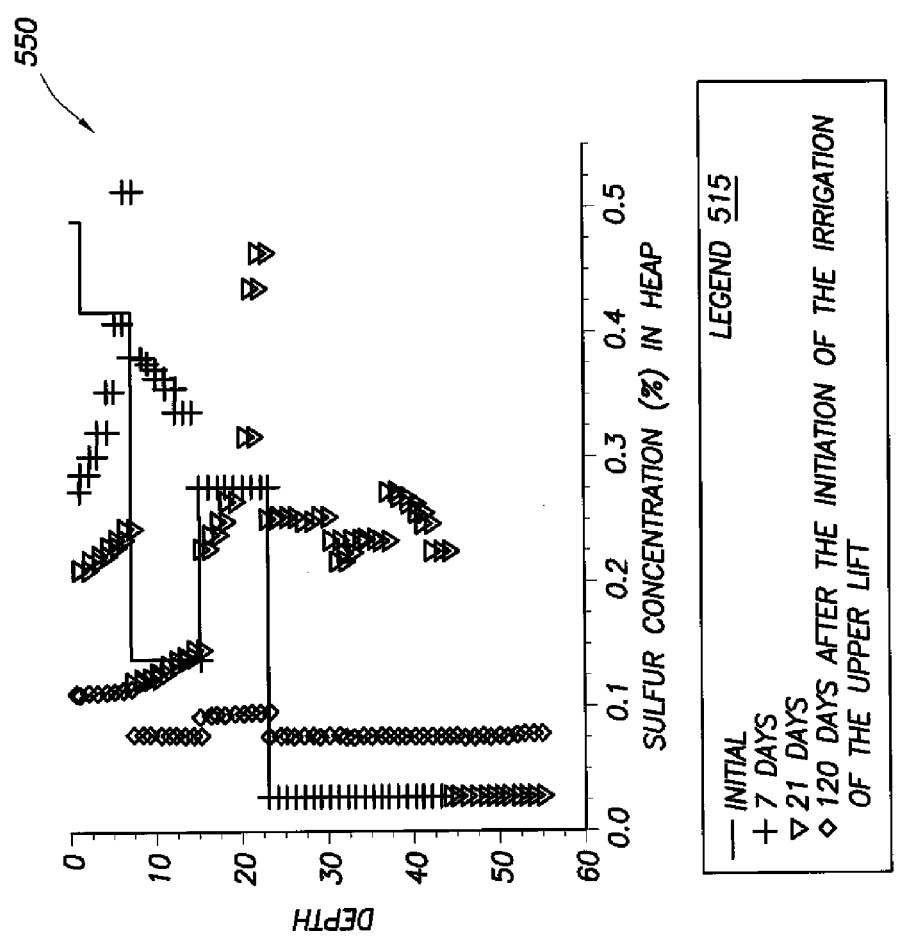
FIG.5.5

HEAP LEACH OPERATIONS

BACKGROUND

Heap leach mining is a common process for extracting metals, such as Gold, Copper and Uranium, from ore. The mined metal may be a base, precious, and/or strategic metal. In basic terms, heap leach mining is the process of mining ore that contains metal, placing the ore on a pad (having a collection system) in a stack or heap, applying solvents to the top of the heap, and collecting the solvent (which includes dissolved metal leached from the ore, known as pregnant leaching solution or "PLS") via the collection system at the bottom of the heap. The metal is then extracted from the recovered PLS. In some operations, after the metal is recovered, the solvent (now considered "barren") may be re-used.

The pad may be impermeable so that the solution does not soak into the ground. The pad may be placed on slightly sloping ground to facilitate recovery of the PLS after it has passed through the heap and accumulates at the lowest part of the sloping pad. If this method is used, the slope should not be such as to make the heap unstable.

The ore may or may not be crushed before placement in the heap. Some crushing processes include both primary and secondary crushing to efficiently obtain a preferred ore size. Uncrushed ore placed in heaps is commonly described as "run of mine" or "ROM" and the heaps such ore is placed on are commonly known as a "stockpile." Unless otherwise specified, the term heap leach as used herein includes ROM operations as well as crushed ore operations, which are more commonly thought of as "heap leach," and the term "heap" includes ROM stockpiles. The solvent is often applied using sprinklers or drip systems for efficient distribution without excessive evaporation.

A stack of the ore above the pad is called a "lift." In some heap leach operations, ore is laid down having a particular lift height, and solvent is applied and recovered for some time. Then additional ore is placed on top of the first lift and the process is repeated. There may be several stacks of ore on one pad, as the process continues. These are called "multi-lift heaps." If the leached ore is removed before another lift is put on the pad, the operation may be called an "on/off" pad. Single lift operations, where there is only one lift of ore, are also used.

The leaching process (that is applying the solvent to the heap and collecting enriched solvent at the bottom of the heap at the pad) is an ongoing process, with more solvent being applied to the top of the heap until as much metal as is practicable has been recovered. This process may take months and may exceed one or more years, especially in ROM operations. At any time after the process begins, a certain amount of solution is in the heap along with the metal it contains, so that there may be a certain percentage of the value of the metal from the mine that cannot be obtained until all solution is recovered and the operation is shut down.

In addition (or as an alternative) to conventional solvents, bacteria may be applied in solution in some heap leach operations to ingest and transport the metal. The bacteria may have certain needs in order for a bioleaching process to work efficiently, such as appropriate temperatures and adequate levels of iron and oxygen in the bacterial solution.

While one may consider the step of mining the ore as part of the heap leach process or as a process preliminary to the heap leach process, heap leach mining operations may involve ongoing interaction between excavation of the ore and the heap operation itself. The leaching process is highly dependent upon ore properties, such as grade, mineralogy and particle size of the ore. These ore properties may vary across the area of extraction and/or as a result of the operating plan.

Mining operations are typically pre-planned with the aid of a block model of the mine from which the ore is extracted, the block model having estimates of ore grade and other rock properties throughout the block of ore to be extracted. Samples may be collected and analyzed from the mine to obtain these estimates. Using the block model, estimates are made of the ore grade, mineralogy, and particle sizes which will be available for leaching as the excavation and heap leach process progress. This prediction is used to devise heap building and leaching operating plans. Simplified hydrological and empirical metallurgical models are used to develop pre-operational estimates of the leaching process. However, deviations from the predicted ore grade, mineralogy, and particle size pre-mining plan result in deviations from the heap caused by pre-mining estimates, which in turn diminish the validity of leaching predictions. These factors result in potential operational inefficiency and difficulty in making accurate estimates of cash flow.

The heap leach process can take up to several months per pad and, therefore, monitoring how efficiently the metals are leached an be a challenge. Many factors contribute to the efficiency of a heap leach operation, including temperature of the heap as well as the method of application of the solvent to the heap.

SUMMARY

In general, in one aspect, the invention relates to a method of heap leaching including forming a heap lift comprising a first heap layer placed underneath a second heap layer by placing ore extracted from a mine onto a leach pad, the heap lift being irrigated using a solvent formulated to leach a first chemical element of economic interest from the ore into a solution comprising the solvent and the first chemical element, installing a horizontal solution collection system between the first heap layer and the second heap layer, the horizontal solution collection system including a horizontal tubing with a first wireline data collection tool disposed therein, providing a heap leach model for modeling the heap leach operation, the heap leach operation including a solvent formulation and a irrigation setting, obtaining collected data from the first wireline data collection tool while irrigating the heap lift, the collected data including in-situ material parameters of the first heap layer and the second heap layer and in-situ solution parameters of the solution flowing in the first heap layer and the second heap layer, modeling the heap leach operation using the collected data based on the heap leach model to generate a result, and adjusting the heap leach operation based on the result.

Other aspects of the invention will be apparent from the following description and the appended claims.

BRIEF DESCRIPTION OF THE DRAWINGS

FIG. 1.1 is a schematic view, partially in cross-section, of a heap leach mining field having a mine under excavation and a heap leach lift with data acquisition tools positioned therein for collecting data from the heap, in which embodiments of heap leach operations may be implemented.

FIG. 1.2 is a block diagram of a direct monitoring and sampling system in accordance with one or more embodiments.

FIG. 1.3 is a block diagram of a heap leach operation in accordance with one or more embodiments.

FIGS. 2.1 and 2.2 show a system in which embodiments of heap leach operations may be implemented.

FIGS. 4.1-4.3 show a three-dimensional model overview of a mining operation showing extraction pit and leach heap in accordance with one or more embodiments.

FIGS. 5.1-5.5 show an example in accordance with one or more embodiments.

DETAILED DESCRIPTION

Figure 3:
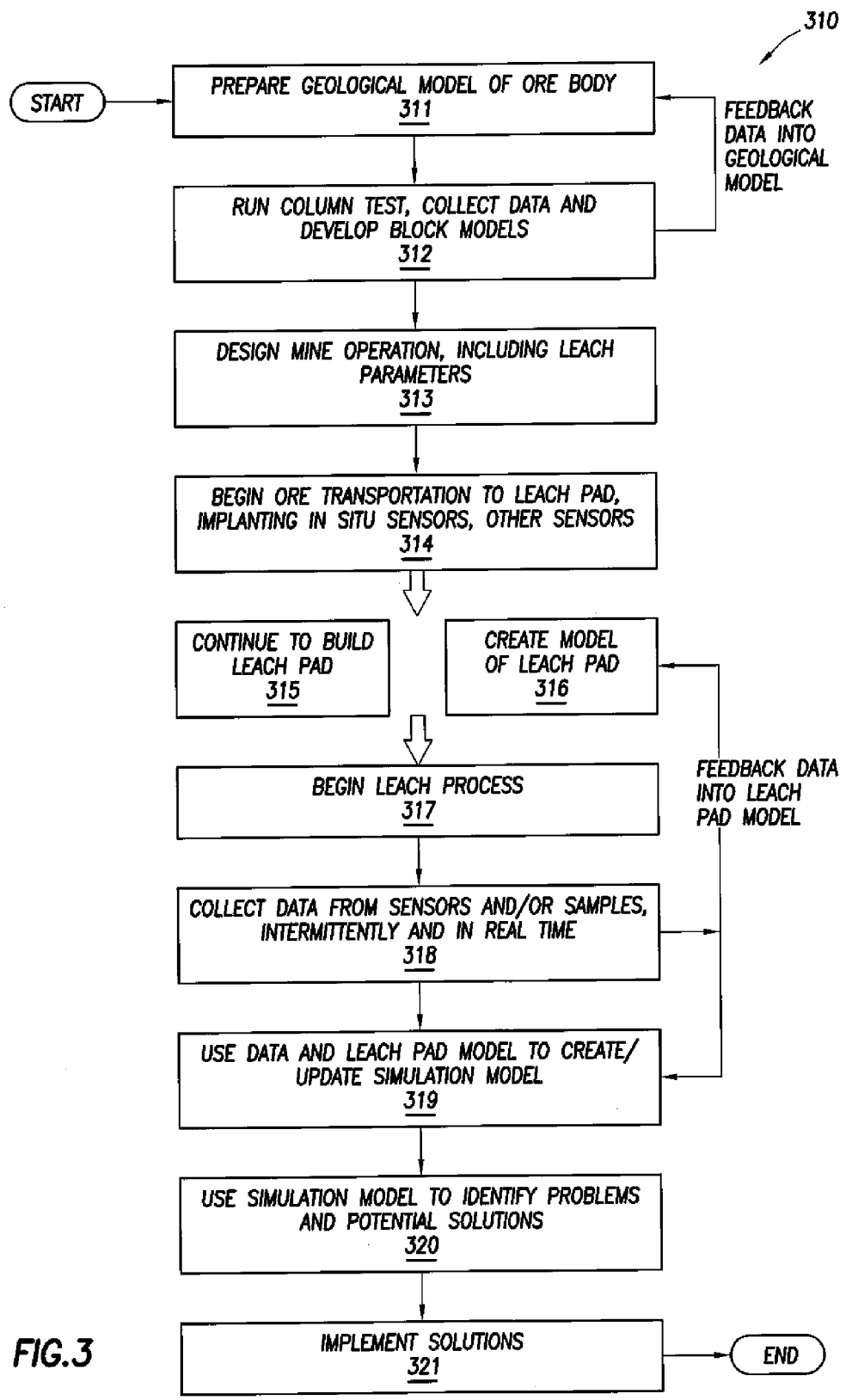
FIG. 3 shows a flow chart of a method in accordance with one or more embodiments.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

Embodiments of heap leach operations include a range of applications that individually and/or collectively can provide mine operators with innovative technologies (instrumentation, monitoring, production modeling) and systems (supervisory control and data acquisition or "SCADA") that may improve the efficiency and profitability of heap leach operations. These technical applications are bundled as part of an overall work flow diagram as shown in FIGS. 1.1 and 1.2.

FIG. 1.1 shows a schematic block diagram of a heap leach mining field (110) having a mine under excavation (102) and a heap leach lift (101) where the mined ore is transported from an extraction pit (not shown) of the mine under excavation (102) to the heap leach lift (101) as represented by the arrow (103). In addition, the heap leach lift (101) includes layers (6)-(12) and is configured with monitoring/data collection/analysis system components for collecting data from the heap leach lift (101).

In one or more embodiments, the monitoring/data collection/analysis system components may include monitoring wells (14), a horizontal solution collection system (2) installed with interlift liners (e.g., interlift liner (13)), fiberoptics (1) embedded in the heap along horizontal tubings of the horizontal solution collection system (2), a direct monitoring and sampling system (3), and an indirect monitoring system (e.g., downhole geophysics tools (4), surface geophysics tools (5), etc.). The direct monitoring and sampling system (3) and the indirect monitoring system may be installed in the horizontal solution collection system (2) and/or the monitoring well (14). The direct monitoring and sampling system (3) collects physical samples (solid or fluid), which are analyzed to measure in-situ element concentrations. As indicated above, the indirect monitoring system may include downhole geophysics tools (4) and/or surface geophysics tools (5) whereby the instrument detects and measures in-situ concentrations of specific elements (metals). Examples of downhole geophysics tools (4) may include Combinable Magnetic Resonance (CMR), Accelerator Porosity Sonde (APS), compensated neutron log(CNL), Lithology Density Tool (LDT), Elemental Capture Spectroscopy Sonde (ECS), Array Induction Imager Tool (AIT), Natural Gamma Ray Spectroscopy Sonde (NGS), X-ray Fluorescence (XRF), Optical Spectrometry (OS), etc. Examples of surface geophysics tools (5) may include Electrical Resistivity Tomography (ERT), spontaneous potential (SP) measurement, etc. For example, ERT is illustrated as short line segments in FIG. 1.1 representing electrodes hammered into the heap to for a vertical electrical resistivity array meeting necessary electrical contact requirements. Example parameters measured in the heap using these tools are listed in TABLE 2 below. Although the borehole of the monitoring well (14) is shown in a vertical orientation, in one or more embodiments, the heap leach lift (101) may also include a monitoring well (not shown) with a deviated or horizontal borehole (not shown) drilled using a directional drilling system (not shown), or a casing laid in during the construction of the heap.

In one or more embodiments, the direct monitoring and sampling system (3) may be used for mapping the spatial and temporal distribution of solution chemistry within the heap (e.g., the heap leach lift (101) of FIG. 1.1) to provide mine operators with valuable multi-level, real time data regarding the performance of their heap leach operations. The information obtained from the direct monitoring and sampling system (3) would enable mine operators to optimize their heap leach operation in terms of metal recovery and resource utilization. Examples of direct monitoring and sampling system (3) may include the Westbay® System. (Westbay is a registered trademark of Westbay Instruments Inc., Canada now a part of Schlumberger Canada Limited).

TABLE 1 shows example types of heap leach operations that make use of the aforementioned monitoring/data collection/analysis system components as well as the parameters of interest that may be tracked for monitoring performance of the heap leach operation.

TABLE 1

| Oxide Ore (Cu) |
| --- |
| Cu |
| pH |
| EC (Electrical Conductivity) |
| ORP (Oxide Reduction Potential) |
| DO (Dissolved Oxygen) |
| $Fe^{+2}$ |
| $Fe^{+3}$ |
| $SO^4$ |
| Temp. |
| Sulfide Ore (Cu) |
| Cu |
| pH |
| EC |
| ORP |
| DO |
| $Fe^{+2}$ |
| $Fe^{+3}$ |
| $SO^4$ |
| Temp. |
| Bacteria count |
| Oxide Ore (Au, Ag) |
| Au, Ag |
| pH |
| EC |
| ORP |
| DO |
| $Fe^{+2}$ |
| $Fe^{+3}$ |
| $SO^4$ |
| Temp. |
| CN (Cyanide) |
| Alkalinity |
| Total Sulfur |

The installation and monitoring of the direct monitoring and sampling system (3) applied to a heap (e.g., the heap leach lift (101) of FIG. 1.1) may require special considerations. Flow of solutions through a heap is generally designed to occur under unsaturated conditions. This design is chosen because of the geotechnical stability of a heap, which can be 100's of feet in height, and also because from a hydrodynamic standpoint (i.e. bio-leaching of sulfide Copper ores) oxygen is required in order for the metal extraction process to occur. Therefore, the direct monitoring and sampling system (3) must be adapted to collect representative samples of leach solutions from the ore under unsaturated conditions. Other factors may include the harsh conditions associated with the corrosive nature of leach solutions (i.e. sulfuric acid in the case of Cu) and deposition of ore in the leach pad area in 25 to 40-foot lifts using large end dump trucks or spreaders (surface impact during deposition and movement of the ore within the heap due to consolidation). Materials and methods used to adapt a direct monitoring and sampling system, such as the Westbay System, to heap leach monitoring protects the integrity of wells from these harsh conditions.

In one or more embodiments, the direct monitoring and sampling system (3) may be installed within the monitoring well (14). FIG. 1.2 shows an example configuration of the monitoring well (14) penetrating ore (20) of the heap leach lift layers (e.g., one or more of layers (such as layers (6)-(12) depicted in FIG. 1.1 above)) and installed on the inside of a protective casing (26) with slotted zones (e.g., the slotted zone (24)) to sample solutions (e.g., via the measurement port (22)) for the direct monitoring and sampling system (3)) under unsaturated conditions in area of interest (i.e., a target zone). The space between the monitoring well (14) and protective casing (26) is packed with a fine textured, well graded inert medium (25) (e.g., fine silica sand or glass beads). The fine sand (or other suitable inert material) packing creates a soil water matric potential (or matrix potential) gradient between the ore (20) and the sand (25) allowing the sand (25) to become saturated for representative samples of the leach solution to be collected. In one or more embodiments, acid resistant materials (i.e. acid resistant grout, polymer, etc.) are used for the inflatable packers (21) in Copper heaps. Collecting the sample from the sand pack (25) may require that a vacuum be applied via the pumping port (23). A minimum of 200 ml of solution is generally collected and handled/processed to prevent exposure to atmospheric conditions that could alter representative in-situ chemistry. Depending on the type of heap leach operation, the aforementioned direct monitoring well components may be made from PVC or PPVC. Depending on the type of heap leach operation, the protective casing (26) may be constructed of high carbon steel or high density polyethylene (HDPE) while PVC or fiberglass may also be used. Sonic or hammer drilling techniques may be used to install the proposed adapted direct monitoring and sampling system, such as the Westbay System) in existing heaps. In one or more embodiments, the monitoring well (14) with protective casing (26) and sand pack (25) may be extended and backfilled with ore as additional lifts are added to the heap. In addition, it is assumed that the same design for facilitating sampling of unsaturated materials would also be effective to sample environmental constituents in the vadose zone of contaminated sites.

In one or more embodiments, the direct monitoring and sampling system (3) may include inverted conical collars (not shown) that attach to the protective casing (26) to "funnel" and accumulate solutions from unsaturated zones around the sample collection ports (e.g., the measurement port (22)) of the monitoring well (14). Limitations to this application may be related to installation logistics, durability, and representativeness of sampled solutions relative to the target zone. These limitations could possibly be overcome with additional evaluations about the design, functionality, and feasibility of the adapted installations.

Although not explicitly shown in FIG. 1.1, in one or more embodiments, the direct monitoring and sampling system (3) may also be installed within the horizontal solution collection system (2). In one or more embodiments, the horizontal solution collection system (2) includes a drainage lysimeter(s) or collector(s) buried at intervals at the bottom of the uppermost lift (or deeper in the case of a multiple lift system), which is connected via tubing within a protective conduit to a flow through cell (i.e., access port) and vacuum pump located at the outer edge of the heap. Samples of leach solution entering the collector are removed under vacuum and pass through the flow through cell where DO, pH and other parameters are measured with sensors and/or are collected in sample bottles for laboratory analysis.

In one or more embodiments, the horizontal solution collection system (2) is used in conjunction with a direct monitoring and sampling system, such as Westbay, and wireline geophysics for verification and calibration purposes for the heap leach operations. In such embodiments, horizontal monitoring ports (e.g., horizontal monitoring ports (15)) may be advantageously used for making measurements with wireline tools in heap materials because many heap leach operators will not allow traffic on the surface of the heap. The horizontal orientation may also be useful for monitoring on-off leach pad operations. The tools can be passed horizontally through the ports within the upper most lift (or lower lifts) and used to collect real time data on Cu concentrations and other parameters, which can be used by the operators to make adjustments to irrigation rates (e.g., emitter spacing, line pressure, etc.) within the initial critical period of the leach cycle in order to optimize metal recovery. In one or more embodiments, a system of cables and winches are installed and operating at opposite edges of the heap leach lift (101) to pass the logging tools through horizontal monitoring ports (15). As shown in FIG. 1.1, one of the monitoring ports (15) is disposed at the right end of a horizontal tubing between heap layers (9) and (10) while two additional monitoring ports (in cross-sectional view) are disposed in the heap layers (7) and (10), respectively. In one or more embodiments, the downhole geophysics tools (4) may be configured in a vertical borehole (e.g., borehole (14)) or configured in the horizontal solution collection system (2) via the horizontal monitoring port (e.g., monitoring ports (15)).

Generally, the heap leach control center (104) may include computing facilities. In one or more embodiments, the data collected from the monitoring/data collection/analysis system components are used by the heap leach control center (104) to perform analysis and decision making for controlling the operations of the heap leaching mining field. More details regarding controlling the heap leach operations are described in reference to FIGS. 1.3, 2.1, and 2.2 below.

FIG. 1.3 shows a heap leach operation block diagram (130) in accordance with one or more embodiments. For example, the heap leach operation may be performed in the heap leach mining field (110) having mine under excavation (102), heap leach lift (101), and heap leach control center (104) described in reference to FIG. 1.1 above. In the block diagram (130), the mine under excavation (102), heap leach lift (101), and heap leach control center (104) are essentially the same as those depicted in FIG. 1.1 above where an enhanced heap leach model (165) is prepared to model the heap leach operations.

The enhanced heap leach model (165) may include sub-models such as a geologic sub-model, a depositional sub-model, a flow/reactive transport sub-model, and a full scale operational sub-model. Mine data (115) may be used as an input to the enhanced heap leach model (165). Ore (120) from a mine under excavation (102) goes to a heap leach lift (101).

The ore (120) may go through one or more crushing processes before reaching the heap leach lift (101) or the ore (120) may be ROM. If the ore (120) is crushed, information on the quality of the crushed ore (120) may be used as an input to the enhanced heap leach model (165). A monitoring/data collection/analysis system (135) collects information on the heap leach lift (101), in real time and/or periodically. During a model calibration phase, the collected information is used as an input to update the enhanced heap leach model (165).

In one or more embodiments, the enhanced heap leach model (165) is adjusted to minimize the difference between the collected information and corresponding simulated values generated by the enhanced heap leach model (165). The enhanced heap leach model (165) is said to be calibrated when the difference is minimized by such adjustments. More details of updating the enhanced heap leach model (165) based on the collected information from the monitoring/data collection/analysis system (135) are described in reference to FIGS. 4 and 5.1-5.5 below.

Further, during a production phase, feedback (155) from the enhanced heap leach model (165) is sent to a heap leach control center (104), which can design and/or modify the heap leach operation accordingly. For example, the feedback (155) may include a forecast of future leaching output. If the forecast is not satisfactory, the heap leach operation may be adjusted iteratively by the heap leach control center (104) for improvement until the adjusted forecast meets a pre-determined goal of the heap leach operation. In one or more embodiments, the model calibration phase is performed prior to the production phase. In one or more embodiments, the model calibration phase is performed during or in between the production phase(s).

Generally, heap leach mining operations involve ongoing interaction between excavation and heap operation. The efficacy of the leaching process is highly dependent upon the grade, mineralogy and the particle size of the ore, which may vary across the area of extraction and/or as a result of the operating plan. Mining operations are typically pre-planned with the aid of a block model containing estimates of ore grade and other rock properties. In one or more embodiments, the block model is used to estimate the ore grade, mineralogy and particle sizes which will be available for leaching throughout the excavation process. This prediction is used to devise heap building and leaching operating plans.

Simplified hydrological and empirical metallurgical models are used to develop pre-operational estimates of the leaching process. However, deviations from the predicted ore grade, mineralogy and particle size pre-mining plan result in deviations from the heap from pre-mining estimates, which in turn diminish the validity of leaching predictions. These factors result in potential operational inefficiency and difficulty in making accurate estimates of cash flow. Since the leaching process is slow, the impact of any process changes may not realized for months, further exacerbating the problem. To resolve these deficiencies it is necessary to update the block model in near real-time and tightly link the block model with representative hydrodynamic and metallurgical heap process models. In one or more embodiments, such predictive process models includes consideration of technical and operational uncertainties and are coupled with economic models to provide probabilistic estimates of cash flow and other related financial metrics.

FIGS. 2.1 and 2.2 show a system in which embodiments of heap leach operations may be implemented. For example, the system may be included in the heap leach mining field (110) described in reference to FIG. 1.1 above.

FIG. 2.1 shows a diagram of a system (200) to perform heap leach operations in accordance with one or more embodiments. The system (200) includes a heap leach modeling tool (220), a user system (240), one or more data sources (250), a model generation module (270), and operations model module (260). The heap leach modeling tool (220) includes a storage repository (230), one or more application interfaces (221), and a heap leach simulator (223). The user system (240) includes a processor (241), a user interface (242), and a display unit (243). Each of these components is described below. One of ordinary skill in the art will appreciate that embodiments are not limited to the configuration shown in FIG. 2.1.

In one or more embodiments, the heap leach modeling tool (220) is configured to interact with one or more data sources (250) using one or more of the application interface(s) (221). The application interface (221) may be configured to receive data (e.g., field data or collected data) from a data source (250) and/or store data to the storage repository (230). In addition, the application interface (221) may be configured to receive data from the storage repository (230) and deliver the data to a data source (250).

The data source (250) may be one of a variety of sources providing data associated with a field (e.g., the heap leach mining field (110) depicted in FIG. 1.1 above). A data source (250) may include, but is not limited to, a surface unit for collecting data from the field, a computer, a database, a spreadsheet, a user, and a data acquisition tool. For example, the data acquisition tool may be the various sensors described with respect to FIG. 1.1. Further, the surface unit, computer, database, spreadsheet, or user may correspond to the computing facilities and user of the heap leach control center (104) described with respect to FIG. 1.1. A data source (250) may be configured to provide data to the application interface (221) through an automated process, such as through a web-based application, a direct feed, or some other form of automated process. Optionally, a data source (250) may require manual entry of data by a user through a user system (240) using the application interface (221).

In one or more embodiments, the heap leach modeling tool (220) is configured to interact with the model generation module (270) using one or more of the application interfaces (221). The application interface (221) may be configured to receive data (e.g., model output) from the model generation module (270) and/or store the data to the storage repository (230). In addition, the application interface (221) may be configured to receive data from the storage repository (230) and deliver the data to the model generation module (270).

The model generation module (270) may use data, received from the heap leach modeling tool (220) and/or one or more data sources (250), to generate various models of a field. Such models of the field produced by the model generation module (270) may be in two or three dimensions. In one or more embodiments, a field model is used to mathematically model (e.g., using a simulation system) various aspects of the field. The model generation module (270) may be a device internal to the heap leach modeling tool (220). Alternatively, the model generation module (270) may be an external device operatively connected to the heap leach modeling tool (220). The model generation module (270) may be configured to provide data to the application interface (221) through an automated process, such as through a web-based application, a direct feed, or some other form of automated process. Optionally, the model generation module (270) may require manual entry of data by a user through the user system (240) using the application interface (221). More details of the model generation module (270) and various models generated therefrom are described in reference to FIG. 2.2 below.

In one or more embodiments, the heap leach modeling tool (220) is configured to interact with the operations model module (260) using one or more of the application interfaces (221). The application interface (221) may be configured to receive data (e.g., model output) from the operations model module (260) and/or store the data to the storage repository (230). In addition, the application interface (221) may be configured to receive data from the storage repository (230) and deliver the data to the operations model module (260). The operations model module (260) may use data, received from the heap leach modeling tool (220), to generate and/or adjust an operating plan for a field based on the output of the heap leach simulator (223). The operations model module (260) may be a device internal to the heap leach modeling tool (220). Alternatively, the operations model module (260) may be an external device operatively connected to the heap leach modeling tool (220). The operations model module (260) may be configured to provide data to the application interface (221) through an automated process, such as through a web-based application, a direct feed, or some other form of automated process. Optionally, the operations model module (260) may require manual entry of data by a user through the user system (240) using the application interface (221). The operations model module (260) may also be configured to send data (e.g., the operating plan) directly to the user system (240).

In one or more embodiments, the processor (i.e., central processing unit (CPU)) (241) of the user system (240) is configured to execute instructions to operate the components of the user system (240) (e.g., the user interface (242), and the display unit (243)).

In one or more embodiments, the user system (240) is configured to interact with a user using the user interface (242). The user interface (242) may be configured to receive data and/or instruction(s) from the user. The user interface (242) may also be configured to deliver instruction(s) to the user. In addition, the user interface (242) may be configured to send data and/or instruction(s) to, and receive data and/or instruction(s) from, the heap leach modeling tool (220) and/or the operations model module (260). The user may include, but is not limited to, an individual, a group, an organization, or some other legal entity. The user system (240) may be, or may contain a form of, an internet-based communication device that is capable of communicating with the application interface (221) of the heap leach modeling tool (220). Alternatively, the heap leach modeling tool (220) may be part of the user system (240). The user system (240) may correspond to, but is not limited to, a desktop computer with internet access, a laptop computer with internet access, a smart phone, and a personal digital assistant (PDA), or other user accessible device.

In one or more embodiments, the user system (240) may include a display unit (243). The display unit (243) may be configured to display data for user visualization. For example, the data may include those stored in the storage repository (230).

As shown, communication links are provided between the heap leach modeling tool (220) and the user system (240), the data source(s) (250), the model generation module (270), and the operations model module (260). A communication link is also provided between the data source(s) (250) and the model generation module (270), and between the user system (240) and the operations model module (260). A variety of links may be provided to facilitate the flow of data through the system (200). For example, the communication links may provide for continuous, intermittent, one-way, two-way, and/or selective communication throughout the system (200). The communication links may be of any type, including but not limited to wired and wireless.

In one or more embodiments, a central processing unit (CPU, not shown) of the heap leach modeling tool (220) is configured to execute instructions to operate the components of the heap leach modeling tool (220) (e.g., storage repository (230), the application interface (221), the heap leach simulator (223)). In one or more embodiments, the memory (not shown) of the heap leach modeling tool (220) is configured to store software instructions for simulating various aspects of the heap leach mine field. The memory may be one of a variety of memory devices, including but not limited to random access memory (RAM), read-only memory (ROM), cache memory, and flash memory. The memory may be further configured to serve as back-up storage for information stored in the storage repository (230).

In one or more embodiments, the heap leach modeling tool (220) is configured to obtain and store field data in the storage repository (230). In one or more embodiments, the storage repository (230) is a persistent storage device (or set of devices) and is configured to receive field data from a data source(s) (250), the model generation module (270), the operations model module (260), and/or from a user system (240) using the application interface (221). The storage repository (230) is also configured to deliver field data to, and receive field data from the heap leach simulator (223). The storage repository (230) may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data for a field. The storage repository (230) may be a device internal to the heap leach modeling tool (220). Alternatively, the storage repository (230) may be an external storage device operatively connected to the heap leach modeling tool (220).

In one or more embodiments, the heap leach modeling tool (220) is configured to interact with the user system (240) using the application interface (221). The application interface (221) may be configured to receive data and/or instruction(s) from the user system (240). The application interface (221) may also be configured to deliver instruction(s) to the user system (240). In addition, the application interface (221) may be configured to send data and/or instruction(s) to, and receive data and/or instruction(s) from, the storage repository (230), and/or the heap leach simulator (223).

In one or more embodiments, the data transferred between the application interface (221) and the data source (250), the model generation module (270), the operations model module (260), and/or the user system (240) corresponds to field data and/or various models of the field. In one or more embodiments, the heap leach modeling tool (220) is configured to support various data formats provided by the data source(s) (250), the model generation module (270), the operations model module (260), and/or the user system (240).

In one or more embodiments, the heap leach modeling tool (220) is configured to perform simulation of various sub-models of a field using the heap leach simulator (223). The heap leach simulator (223) may be configured to receive a model or data from the application interface (221) and iteratively generate simulated values of various parameters of the field. More details of such simulation are described in reference to FIG. 2.2 below.

The heap leach modeling tool (220) may include one or more system computers, which may be implemented as a server or any conventional computing system. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network personal computers, mini-computers, mainframe computers, and the like. Further, the heap leach modeling tool (220) may be a device internal to the heap leach control center (104) depicted in FIG. 1.1. Alternatively, the heap leach modeling tool (220) may be an external device operatively coupled to the heap leach control center (104) depicted in FIG. 1.1.

While specific components are depicted and/or described for use in the units and/or modules of the heap leach modeling tool (220), it will be appreciated that a variety of components with various functions may be used to provide the formatting, processing, utility and coordination functions necessary to modify a magnified field model in the heap leach modeling tool (220). The components may have combined functionalities and may be implemented as software, hardware, firmware, or combinations thereof.

FIG. 2.2 shows an example (280) of the heap leach modeling tool (220) in accordance with an embodiment of the present invention.

In one or more embodiments, the example modeling tool (280) includes a mine block model (282) that is configured to model the ore in place and is the primary platform for extraction operating planning. For example, the mine block model (282) may be considered as a geologic sub-model of the heap leach model (226) and may include geometric, geological, geophysical (e.g., surfaces, layering, bodies, facies, faults and fractures, etc.), and mineralogical representation of the mine, distribution and grade of the resource of interest (e.g., chemical element such as copper) and other associated elements (e.g., sulfur, iron, etc.) in the mine, as well as distribution of petrophysical properties of interest (e.g., ore density, Clay content, granularity, porosity, moisture, hydraulic conductivity, etc.) in the mine. In one or more embodiments, the mine block model (282) may be constructed using a first software package, such as DATAMINE® (a registered trademark of Datamine Corporate Limited, United Kingdom) and VULCAN® (a registered trademark of KRJA Systems, Inc., Lakewood, Colo.), which may be represented as the model generation module (270) of FIG. 2.1 and is designed for use by the mining industry for creation and maintenance of a block model.

In one or more embodiments, the example modeling tool (280) includes a static heap model (283) that is a 3D hydrostratigraphic model configured based on input from the mine block model (282) to model various forms of heterogeneity which may be developed in the heap building process. For example, the static heap model (283) may be considered as a depositional sub-model of the heap leach model (226) and may include geometric, geological, geophysical (e.g., surfaces, layering, bodies, facies, faults and fractures, etc.), and mineralogical representation of the heap leach lift, distribution and grade of the resource of interest (e.g., chemical element such as copper) and other associated elements (e.g., sulfur, iron, etc.) in the heap leach lift, as well as distribution of petrophysical properties of interest (e.g., ore density, clay content, granularity, porosity, moisture, hydraulic conductivity, etc.) in the heap leach lift. In one or more embodiments, the aforementioned properties are measured or evaluated at various locations within the heap leach lift and are dependent on origin, selection, and transport from the mine and deposition on the heap. In one or more embodiments, the static heap model (283) may be constructed using a second software package such as PETRELTM® (a registered trademark of Schlumberger Technology Corporation, Houston, Tex.), VISUAL MODFLOW® (a registered trademark of Schlumberger Canada Limited, Canada), which may be represented as the model generation module (270) of FIG. 2.1.

In one or more embodiments, the example modeling tool (280) includes a fluid flow and geochemical process simulator (284) that is configured to model hydrologic and geochemical processes within the heap, thereby simulating the heap leaching operation. For example, the fluid flow and geochemical process simulator (284) may be associated with a flow/reactive transport sub-model of the heap leach model (226) that may include a gridded representation of the heap leach lift geometry and properties as well as numerical algorithms to simulate the flow and reaction of the leachate with the ore material throughout the heap leach lift. In one embodiment depending on the available monitoring data, simple software packages implementing phenomenological models in 1D or 2D may be used for this purpose, such as shrinking core or shrinking particle models known to those skilled in the art. In other embodiments, more complex geometric, hydrological, and geochemical modeling in 3D may be achieved using software packages such as ECLIPSE® (a registered trademark of Schlumberger Technology Corporation, Houston, Tex.), VISUAL MODFLOW® (a registered trademark of Schlumberger Canada Limited, Canada).

In one or more embodiments, the example modeling tool (280) includes user interface and economical analysis module (281) that is configured to provide user interface and perform financial calculations and decision analyses based on estimates of flow from the fluid flow and geochemical process simulator (284), costs, commodity prices, and operational and economic uncertainties. For example, the user interface and economical analysis module (281) may generate stochastic analysis of total cash flow, net present value, and other basic economic metrics for evaluating the extraction and heap leaching operation based on an operating plan. In one or more embodiments, the example modeling tool (280) is further configured with capability to provide diagnostic information which may be used to adjust or optimize the operating plan based on new information. New information may be in the form of technical or operational data acquired during mining operations, economic data plan impacting operational costs, or variation in commodity value. In one or more embodiments, the operating plan may be developed using the operations model module (260) depicted in FIG. 2.1 above.

FIG. 3 is a flow chart of a method for a heap leach mining optimization process (310) in accordance with an embodiment of the present invention. For example, the heap leach mining optimization process (310) may be performed in the heap leach mining field (110) described in reference to FIG. 1.1 above.

Initially in block 311, a geological model of the ore body (i.e. of the ore in place in the mine) is prepared. In block 312, column tests are run on the ore in the mine, ore data is collected and block models are developed. In block 313, the mining operation, including heap leach operation and parameters, is designed.

In block 314, the leach pad is installed and ore transportation to the leach pad begins. In one or more embodiments, a heap lift is formed that includes a first heap layer placed underneath a second heap layer by placing ore extracted from the mine onto a leach pad in preparation for irrigation using a solvent. The solvent is formulated to leach a chemical element of economic interest from the ore into a solution.

In addition, in-situ and other sensors are installed in the heap as desired. In one or more embodiments, a horizontal solution collection system is installed between the first heap layer and the second heap layer. Specifically, the horizontal solution collection system is installed subsequent to placing the first heap layer and prior to placing the second heap layer. In one or more embodiments, the horizontal solution collection system includes a horizontal tubing with a horizontal wireline data collection tool installed inside the horizontal tubing. In one or more embodiments, a borehole is drilled through at least the first heap layer and the second heap layer. The borehole is then completed and installed with a vertical wireline data collection tool.

In one or more embodiments, the heap leach model is extended as the heap lift is expanded, for example by placing a third heap layer above the second heap layer. In one or more embodiments, the borehole is extended subsequent to placing the third heap layer to expand the heap lift. In other embodiments, the borehole is capped subsequent to placing the third heap layer to expand the heap lift. Accordingly, the vertical wireline data collection tool becomes an embedded data collection system.

In block 315, building of the leach pad continues and in block 317, the leach process begins with solvent being applied to the heap on the leach pad. In block 316, a model of leach pad is created. In one or more embodiments, a heap leach model is provided for modeling the heap leach operation. For example, the heap leach operation includes determining a solvent formulation and an irrigation setting. In one or more embodiments, the heap leach model is updated in a feedback loop (i.e., blocks 316, 317, and 318) to match simulated values and actual measurements (i.e., collected data from the sensors depicted in FIGS. 1.1 and 1.2 above) of various parameters of the leaching operations, such as in-situ and final metal concentrations in the solution. In one or more embodiments, the heap leach model may be updated in real time during the leaching operation. More details of the feedback loop are described in reference to block 319 below.

In block 318, heap leach data from sensors and/or samples, is collected intermittently and/or in real time. In one or more embodiments, data is collected from the horizontal and/or vertical wireline data collection tools while irrigating the heap lift. For example, the collected data may include in-situ material parameters of the heap layers and in-situ solution parameters of the solution flowing in the heap layers.

In block 319, the heap leach data and leach pad model are used to create/update a simulation model, which is used to, identify problems and potential solutions in block 320. In one or more embodiments, the heap leach operation is modeled using the collected data based on the heap leach model to generate a result. For example, the result may indicate that the solvent formulation and/or irrigation schedule are sub-optimal. Accordingly, solutions are then implemented in block 321. Specifically, the heap leach operation is adjusted based on the result. For example, the solvent formulation and/or the irrigation schedule may be optimized based on the result. Such process control feedback for optimizing the heap leach operation corresponds to the feedback (155) during the aforementioned production phase depicted in FIG. 1.3 above.

In one or more embodiments, modeling the heap leach operation includes: (a) iteratively generating simulated values of material parameters of the heap layers and solution parameters of the solution flowing in the heap layers; (b) iteratively comparing the simulated values and the collected data to determine a difference between them; and (c) adjusting a parameter of the heap leach model to minimize the difference. Such a feedback loop for calibrating the heap leach model corresponds to the feedback (155) during the aforementioned calibration phase depicted in FIG. 1.3 above. For example, the parameter may be initialized according to data available and subsequently optimized by Parameter Inversion including mathematical parameter estimation and optimization algorithms known to those skilled in the art, such as linear and non-linear inversion, least square regression, Bayesian inversion, artificial neural networks, genetic algorithm, radial basis function networks, etc. For example this may be achieved using software package such as VISUAL PEST-ASP offered by Schlumberger Canada Limited Corporation, Canada.

For example, various parameters in the depositional sub-model of the heap leach model (226) of FIG. 2.1 may be adjusted to minimize the difference thereby improving the modeling accuracy. Further, while some of the parameters in the heap leach model may correspond to real life known and controllable parameters, such as the feed acid concentration, the leaching solution flow rate and temperature at the surface of the heap, other parameters, such as the granular size distribution (in case of crushed ore), may not be measurable throughout the heap and can only be estimated in real life application with a large uncertainty. In one or more embodiments, such estimated parameters may be adjusted to minimize the difference between the simulated values and the collected data.

In one or more embodiments, the difference relates to concentrations of a first chemical element of economic interest for the heap leach operation, a second chemical element that participates in a chemical reaction between the solvent and the first chemical element, a third chemical element that participates in infiltration of the solution, and/or a fourth chemical element that does not participate in the chemical reaction and the infiltration. In particular, the second chemical element, the third chemical element, and the fourth chemical element are of no economic interest to the heap leach operation but may contribute to the calibration of the model. More details of adjusting the model parameter to optimize the heap leach model are described in reference to FIG. 5.5 below.

FIG. 4.1 depicts a screenshot (410) of a three-dimensional (3D) heap leach model overview of a mining operation showing extraction pit (411) and leach heap (412) in accordance with one or more embodiments. For example, the 3D heap leach model may be the heap leach model (226) of the system (200) for the heap leach mining field (110) described in reference to FIGS. 2.1 and 1.1, respectively. In particular, the extraction pit (411) may be in the mine under excavation (102), the leach heap (412) may be the heap leach lift (101), and the mass transfer (413) may correspond to the transportation (103) depicted in FIG. 1.1 above.

FIG. 4.2 depicts a screenshot (420) of a close up of the 3D heap leach model depicted in FIG. 4.1 with a vertical cross section (421). FIG. 4.3 depicts a screenshot (430) of the 3D heap leach model during simulated leaching showing simulated values in hydraulic conductivity (e.g., displayed on the slice (432)) and fluid saturation (e.g., displayed on the slice (433)) after a period of leach fluid (i.e., solvent) application (431) at the surface of the leach heap (412). In one or more embodiments, the slices (432) and (433) intersect with various heap layers modeled in the 3D heap leach model, for example layers (6) through (12) depicted in FIG. 1.1 above. Additional example simulated values generated from the 3D heap leach model are shown in FIGS. 5.1-5.5 below.

FIGS. 5.1-5.5 show an example in accordance with one or more embodiments. Specifically, FIGS. 5.1-5.5 show example simulated values of chemical element (e.g., copper, sulfur) concentrations generated from a shrinking core/1D infiltration simulation for a leach heap.

As shown in FIG. 5.1, the leach heap is composed of a succession of three heap layers (i.e., layer 1 (512), layer 2 (513), and layer 3 (514)) in a newly formed (i.e., not yet leached) upper lift overlying an exhausted (i.e., fully leached) lower lift (515). Specifically, layer 1 (512) ranges from a depth 0 to 6, layer 2 (513) ranges from a depth 6 to 15, layer 3 (514) ranges from a depth of 15 to 23, and the lower lift (515) ranges from a depth 23 to 55. In addition, at the initial time point of the simulation, the copper concentrations for layer 1 (512), layer 2 (513), layer 3 (514), and the lower lift (515) is initialized at 1.5%, 0.5%, 1%, and 0.1%, respectively. As noted above, the copper concentrations of the layer 1 (512), layer 2 (513), and layer 3 (514) may be based on actual measurements of the ore in each of the three layers or from a simulation results of the mine block model (282) depicted in FIG. 2.2 above. The copper concentration of the lower lift (515) is set to 0.01% to reflect an example of a fully leached exhausted condition in a preceding lift.

Based on a user selected values in a set of hydrodynamic and chemical parameters of the heap leach model used in the simulation, the simulated values of copper concentrations in each of the three heap layers and the lower lift are calculated and plotted versus depth in the leach heap as curves in the plot (510). The curves represent simulated values, as identified based on legend (511), at 7 days, 21 days, and 120 days after initiating irrigation of the upper lift.

These curves in the plot (510) show clearly the extraction of Copper from the ore matrix and its progression downwards. The rate and progression of this simulated extraction are dependant on the settings (i.e., user selected values) of the chemical concentration in the solvent as well as hydrodynamic and chemical parameters in the model. These settings in this example include, but are not limited to, the feed acid (i.e., solvent) concentration, the leaching solution flow rate per unit surface of heap, the particle size distribution in the ore, the average stoichiometric coefficient of the reaction between copper and acid ion H+, the ore and the leaching solution density, the initial copper concentrations in the heap, the effective diffusivity coefficient for the shrinking core model, and the porosity and moisture content through the heap.

While some of these parameters may correspond to real life known and controllable parameters, such as the feed acid concentration, the leaching solution flow rate and temperature at the surface of the heap, other parameters, such as the granular size distribution (in case of crushed ore), may not be measurable throughout the heap and can only be estimated in real life application with a large uncertainty.

FIG. 5.2 shows a plot (520) of simulated values of copper recovery percentage (represented by the vertical axis) in the leachate solution at exit port of the leach heap versus time (represented by the horizontal axis) as measured in terms of days after initiating the irrigation. These simulated values are calculated based on the aforementioned user selected values in the set of hydrodynamic and chemical parameters of the heap leach model. Once the uncertain parameters are calibrated, the simulated values provide a time lapse view to predict the copper recovery over time. Accordingly, the controllable parameters may then be adjusted to achieve a larger or earlier recovery of the copper in heap. Calibrating the uncertain parameters is illustrated in FIGS. 5.3-5.5 below.

FIG. 5.3 shows a plot (530) including simulated values of copper leachate solution versus depth in the leach heap, which are calculated based on the aforementioned user selected values in the set of hydrodynamic and chemical parameters of the heap leach model. In addition to the curves representing simulated values, actual measured values based on data collected from Westbay tools are superimposed onto these curves in the plot (530) at 7 days, 21 days, and 120 days after initiating irrigation of the upper lift, as identified based on legend (513). The correlation between the simulated values and the collected data indicates that the set of user selected parameters of the heap leach model used in the simulation are well calibrated. Alternatively or in addition, full vertical (or lateral) profiles of concentration of copper in the heap may be measured by appropriate geophysical logging operations (e.g., listed in Table 2 below). As indicated by this example, the parameter adjustment for calibrating the heap leach model may be sufficient with less than 21 days worth of collected data while it would take several months to get a reliable estimation of recovery by observing the recovery curve depicted in FIG. 5.2 above.

Moreover, an estimation of recovery evolution from observation of data collected at exit port of the leach heap, such as depicted in FIG. 5.2 above, is less reliable for model calibration purposes as being close to an empirical curve fitting, while the modeling and instrumentation combination provides a more reliable model calibration as depicted in FIG. 5.3 above.

FIG. 5.4 shows a plot (540) of the simulated values of acid concentration (H+ concentration) compared to measured values from leachate sampling after proper adjustment of the aforementioned simulation model parameters to eliminate the comparison difference. Accordingly, the acid concentration can also be used for heap leach model calibration.

FIG. 5.5 shows a plot (550) of the simulated values of sulfur concentration in the heap, as derived from the ore mineralogy, acid composition, and stoichiometric coefficients. Concentration of sulfur in the heap can be measured with the same logging technology as for copper concentration.

Other important parameters in the heap leach model, such as bulk density, ore porosity (or hydrogen index), water saturation (or moisture content), hydraulic conductivity, have been set to constant values in the example described above. In other examples, these parameters may be more accurately (e.g., depth or space dependent) initialized and monitored by the appropriate logging instrumentation (e.g., listed in Table 2 below) to further calibrate the heap leach model.

Moreover, concentrations of chemical elements not directly related to the leaching process (e.g., iron, silica, calcium, potassium, thorium, etc.) may also be used to calibrate the heap leach model. For example, Silica concentration (or Bulk Density) generally does not change significantly over time and therefore can be used as an indicator of other changes such as compaction. In another example, thorium and potassium in relation with clay content and clay type may affect the leaching efficiency indirectly and therefore can be related to additional measurements (e.g., leachate ionic composition, moisture content, temperature) to improve time lapse measurements of resistivity measurements from logging or resistivity arrays. Some parameters (e.g., reaction rates and electrical resistivity) may be temperature dependent and modeled based on monitoring of temperature throughout the heap. In yet another example of bio-leaching, the monitoring of temperature throughout the heap may help determine whether ideal conditions are achieved for bacterial action, or whether some modification of the irrigation process is required.

In one or more embodiments, the heap leach model may be configured initially with the aforementioned parameters initialized according to data available for a given mine and operation. This first model is used to design and optimize the instrumentation and the schedules of time lapse logging and sampling, and provide an initial forecast of the recovery curve. A first logging operation is run before the start of the leaching to adjust the parameters of the layered heap model. The heap leach model simulation may be performed again based on the adjusted parameters to further validate or optimize the schedules of time lapse logging and sampling, or to further modify and optimize the planned leaching operation parameters.

As noted above, this parameter optimization of the heap leach model may be done by manual iteration, or by Parameter Inversion including mathematical parameter estimation and optimization algorithms known to those skilled in the art, such as linear and non-linear inversion, least square regression, bayesian inversion, artificial neural networks, genetic algorithm, radial basis function networks, etc.

Although the description above uses copper as an example for the heap leach operations, embodiments of the heap leach operations may also be applied to other metal or chemical elements (e.g., gold, silver, uranium, nickel, etc.). TABLE 2 shows techniques and corresponding parameters that are measured for configuring and calibrating the heap leach model in one or more embodiments of the heap leach operations.

TABLE 2

| Technique | Parameters measured |
|---|---|
| Combinable Magnetic Resonance (CMR) Expert Magnetic Resonance Service (MR Scanner) | Porosity Pore size distribution Hydraulic conductivity Volumetric water % Saturation Capillary pressure |
| Array Induction Imager Tool (AIT) | Electrical resistivity Dielectric properties |
| Natural Gamma Ray Spectroscopy Sonde (NGS) | In-situ thorium concentration In-situ uranium concentration (*) In-situ potassium concentration |
| Elemental Capture Spectroscopy Sonde (ECS) | Mineralogy Lithology Geochemistry: calcium, silica, chlorine, hydrogen, potassium, iron concentrations In-situ copper concentration In-situ sulfur concentration In-situ nickel concentration (**) In-situ titanium concentration |
| Accelerator Porosity Sonde (APS) | Volumetric water % Saturation |
| Lithology Density Tool (LDT) | Bulk density Porosity Volumetric air content % Saturation Photoelectric factor |
| Leachate Sample analysis | Total copper in solution Total iron in solution Total sulphur in solution EC DO pH Free acid Temperature |
| Westbay Multilevel Groundwater Characterization and Monitoring and sampling Systems Leachate Sample Analysis | Total copper in solution pH Free acid EC $Fe^{2+}/Fe^{3+}$ ORP DO $SO_4$ Bacteria count |
| Fiber optics | Temperature |

Figure 6:
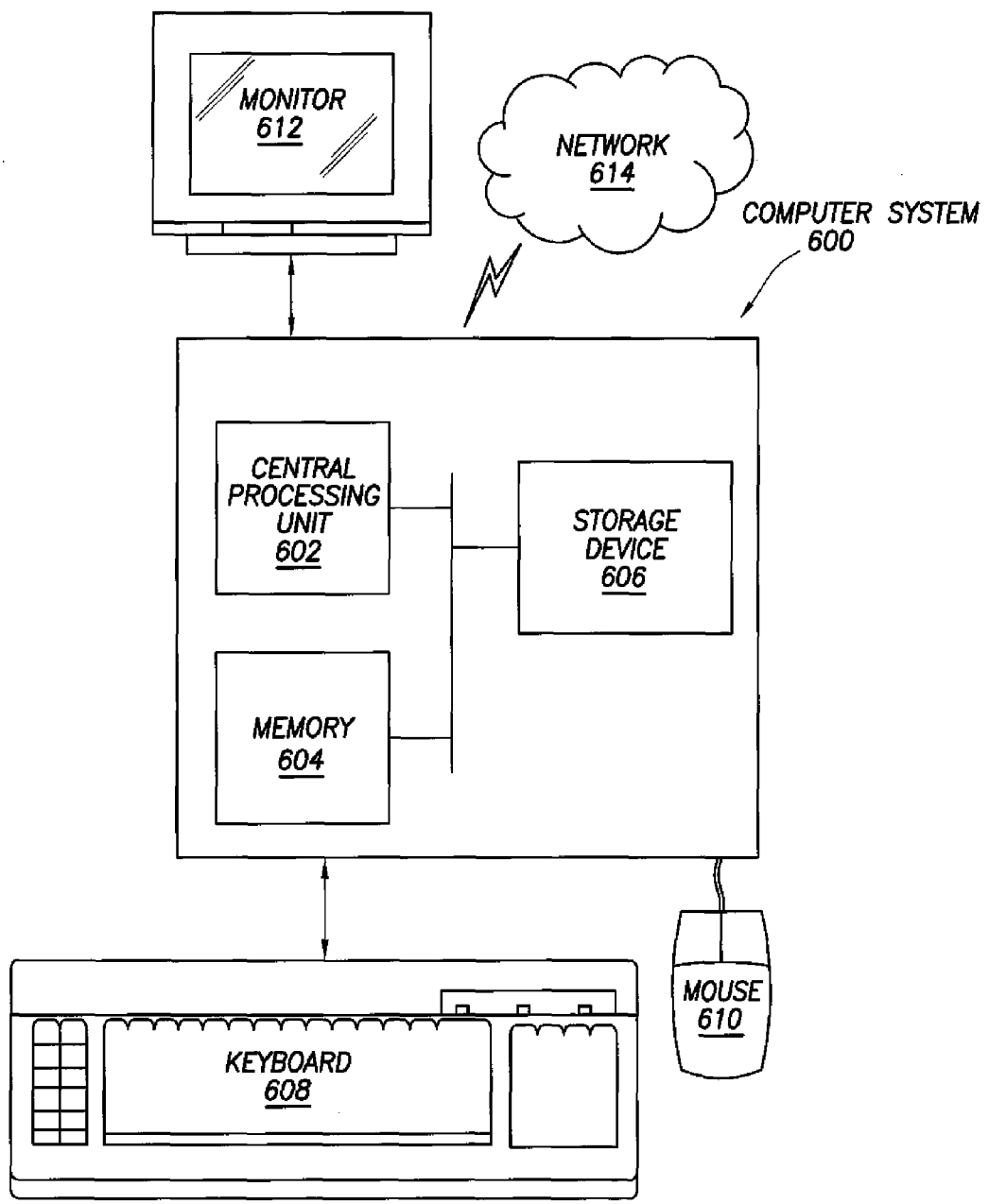
FIG. 6 shows a computer system in which one or more embodiments of heap leach operations may be implemented.

(*) Applicable to heap leaching for uranium
() Applicable to heap leaching for nickel extraction Embodiments of heap leach operations may be implemented on virtually any type of computer regardless of the platform being used. For instance, as shown in FIG. 6, a computer system (600) includes one or more processor(s) (602) such as an integrated circuit, a central processing unit (CPU), or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display LCD, a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, or any other computing system capable of executing computer readable instructions), and the aforementioned input and output means may take other forms, now known or later developed. Generally speaking, the computer system (600**) includes at least the minimal processing, input, and/or output means necessary to practice one or more embodiments.

Further, those skilled in the art will appreciate that one or more elements of the aforementioned computer system (600) may be located at a remote location and connected to the other elements over a network. Further, one or more embodiments may be implemented on a distributed system having a plurality of nodes, where each portion of the implementation (e.g., various components of the heap leach modeling tool) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a non-transitory computer readable storage medium such as a compact disc (CD), a diskette, a tape, or any other computer readable storage device.

While heap leach operations have been described with respect to a limited number of embodiments, those skilled in the art, having benefit of this disclosure, will appreciate that other embodiments may be devised which do not depart from the scope of the heap leach operations as disclosed herein. Accordingly, the scope of the heap leach operations should be limited only by the attached claims.

What is claimed is:

1. A method of heap leaching comprising:

forming a heap lift comprising a first heap layer placed underneath a second heap layer by placing ore extracted from a mine onto a leach pad, the heap lift being irrigated using a solvent formulated to leach a first chemical element of economic interest from the ore into a solution comprising the solvent and the first chemical element;

installing a horizontal solution collection system between the first heap layer and the second heap layer, the horizontal solution collection system comprising a horizontal tubing with a first wireline data collection tool disposed therein;

providing a heap leach model for modeling the heap leach operation, the heap leach operation comprising a solvent formulation and a irrigation setting;

obtaining collected data from the first wireline data collection tool while irrigating the heap lift, the collected data comprising in-situ material parameters of the first heap layer and the second heap layer and in-situ solution parameters of a solution flowing in the first heap layer and the second heap layer;

modeling the heap leach operation using the collected data based on the heap leach model to generate a result;

adjusting the heap leach operation based on the result;

drilling a borehole through at least the first heap layer and the second heap layer; and completing the borehole with a second wireline data collection tool disposed therein, wherein the collected data is further obtained from the second wireline data collection tool while irrigating the heap lift.

2. The method of claim 1, wherein modeling the heap leach operation comprises:

iteratively generating simulated values of material parameters of the first heap layer and the second heap layer and solution parameters of the solution flowing in the first heap layer and the second heap layer;

iteratively comparing the simulated values and the collected data to determine a difference therebetween; and adjusting a parameter of the heap leach model to minimize the difference.

3. The method of claim 2, wherein the difference relates to concentrations of at least one selected from a group consisting of the first chemical element of economic interest for the heap leach operation, a second chemical element that participates in a chemical reaction between the solvent and the first chemical element, a third chemical element that participates in infiltration of the solution, and a fourth chemical element that does not participate in the chemical reaction and the infiltration, and wherein the second chemical element, the third chemical element, and the fourth chemical element are of no economic interest to the heap leach operation.

4. The method of claim 1, further comprising:

extending the heap leach model in response to placing a third heap layer above the second heap layer to expand the heap lift.

5. The method of claim 1, further comprising:

extending the borehole subsequent to placing a third heap layer above the second heap layer to expand the heap lift.

6. The method of claim 1, wherein the heap leach model comprises at least one selected from a group consisting of a block sub-model for modeling a mining operation of the ore, a geologic sub-model for modeling a static ore body of the heap lift, a depositional sub-model for modeling the forming of the heap lift, a flow/reactive transport sub-model for modeling an interaction between the solvent and the static ore body, and a full scale operational sub-model for modeling coupling between the block sub-model, the geologic sub-model, the depositional sub-model, and the flow/reactive transport sub-model.

\* \* \* \* \*